(12) United States Patent
Ohkawa

(10) Patent No.: US 10,031,275 B2
(45) Date of Patent: Jul. 24, 2018

(54) LIGHT-EMITTING DEVICE AND DISPLAY DEVICE

(71) Applicant: SONY CORPORATION, Tokyo (JP)

(72) Inventor: Shingo Ohkawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/125,680

(22) PCT Filed: Feb. 3, 2015

(86) PCT No.: PCT/JP2015/052944
§ 371 (c)(1),
(2) Date: Sep. 13, 2016

(87) PCT Pub. No.: WO2015/141304
PCT Pub. Date: Sep. 24, 2015

(65) Prior Publication Data
US 2017/0010402 A1     Jan. 12, 2017

(30) Foreign Application Priority Data
Mar. 20, 2014 (JP) .................................. 2014-057460

(51) Int. Cl.
*F21V 7/04*        (2006.01)
*F21V 8/00*        (2006.01)

(52) U.S. Cl.
CPC ........... *G02B 6/0043* (2013.01); *G02B 6/005* (2013.01); *G02B 6/0061* (2013.01); *G02B 6/0068* (2013.01)

(58) Field of Classification Search
CPC ............................. G02B 6/0043; G02B 6/005
See application file for complete search history.

(56) References Cited

U.S. PATENT DOCUMENTS

| 6,568,821 | B1 * | 5/2003 | Page | ..................... | G02B 6/0018 |
| | | | | | 362/609 |
| 2012/0147295 | A1 * | 6/2012 | Kasano | ............. | G02F 1/133603 |
| | | | | | 349/65 |

(Continued)

FOREIGN PATENT DOCUMENTS

| JP | 2004-342454 A | 12/2004 |
| JP | 2011-238484 A | 11/2011 |

(Continued)

*Primary Examiner* — Evan Dzierzynski
(74) *Attorney, Agent, or Firm* — Chip Law Group

(57) ABSTRACT

A light-emitting device of the present disclosure includes: a first light-guiding plate having a first light incidence surface and a first light emission enhancement surface provided with a first pattern; and a second light-guiding plate having a second light incidence surface and a second light emission enhancement surface provided with a second pattern. The first pattern is a pattern constituted by a plurality of first punctiform sections of which an arrangement pitch changes to cause density of the first punctiform sections to increase as a distance from the first light incidence surface increases, and the second pattern is a pattern constituted by a plurality of second punctiform sections of which an arrangement pitch changes to cause density of the second punctiform sections to increase as a distance from the second light incidence surface increases, and when viewed from the light emission direction, regions provided with the first pattern and the second pattern partially overlap, and directions in which densities of the first pattern and the second pattern increase are opposite to each other.

8 Claims, 49 Drawing Sheets

(56) References Cited

U.S. PATENT DOCUMENTS

2013/0010495 A1* 1/2013 Moon .................... G02B 6/003
                                                    362/609
2013/0114293 A1* 5/2013 Morino ................. G02B 6/002
                                                    362/608

FOREIGN PATENT DOCUMENTS

| WO | 2005/057083 A  | 6/2005 |
| WO | 2005/057083 A1 | 6/2005 |
| WO | 2011/108038 A  | 9/2011 |
| WO | 2011/108038 A1 | 9/2011 |

\* cited by examiner

[ FIG. 1 ]
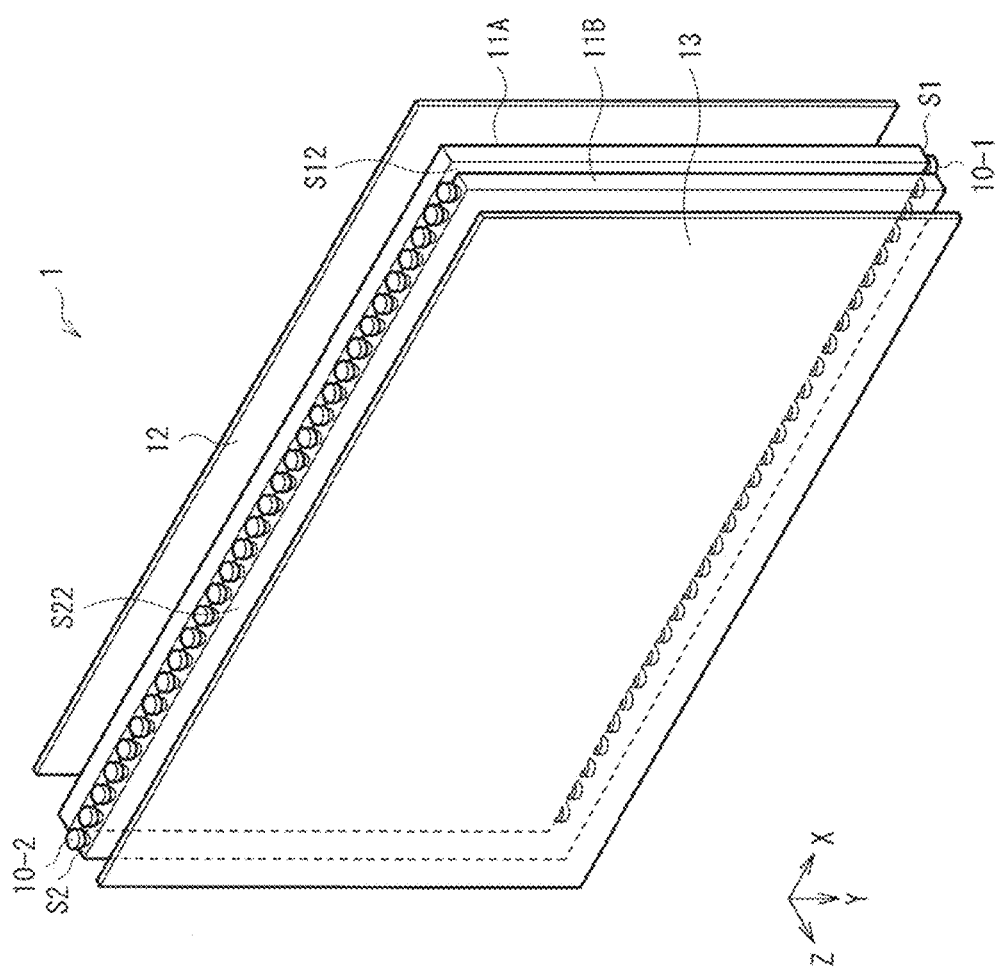

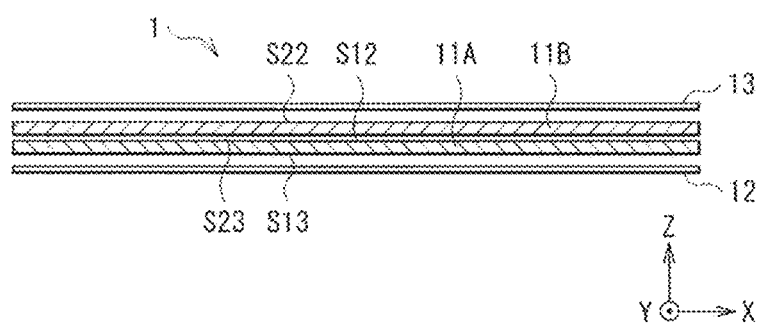
[FIG. 2]

[ FIG. 3 ]
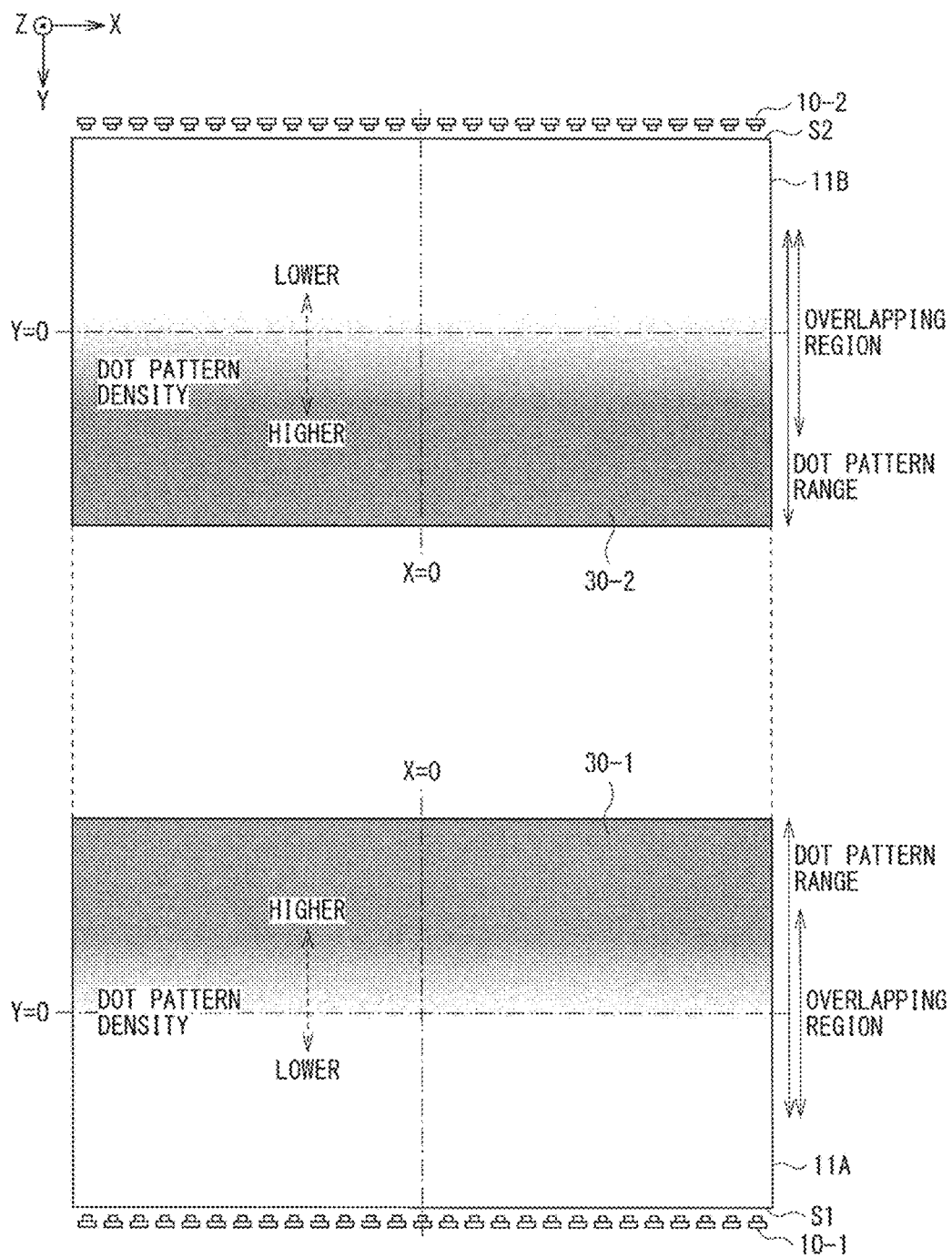

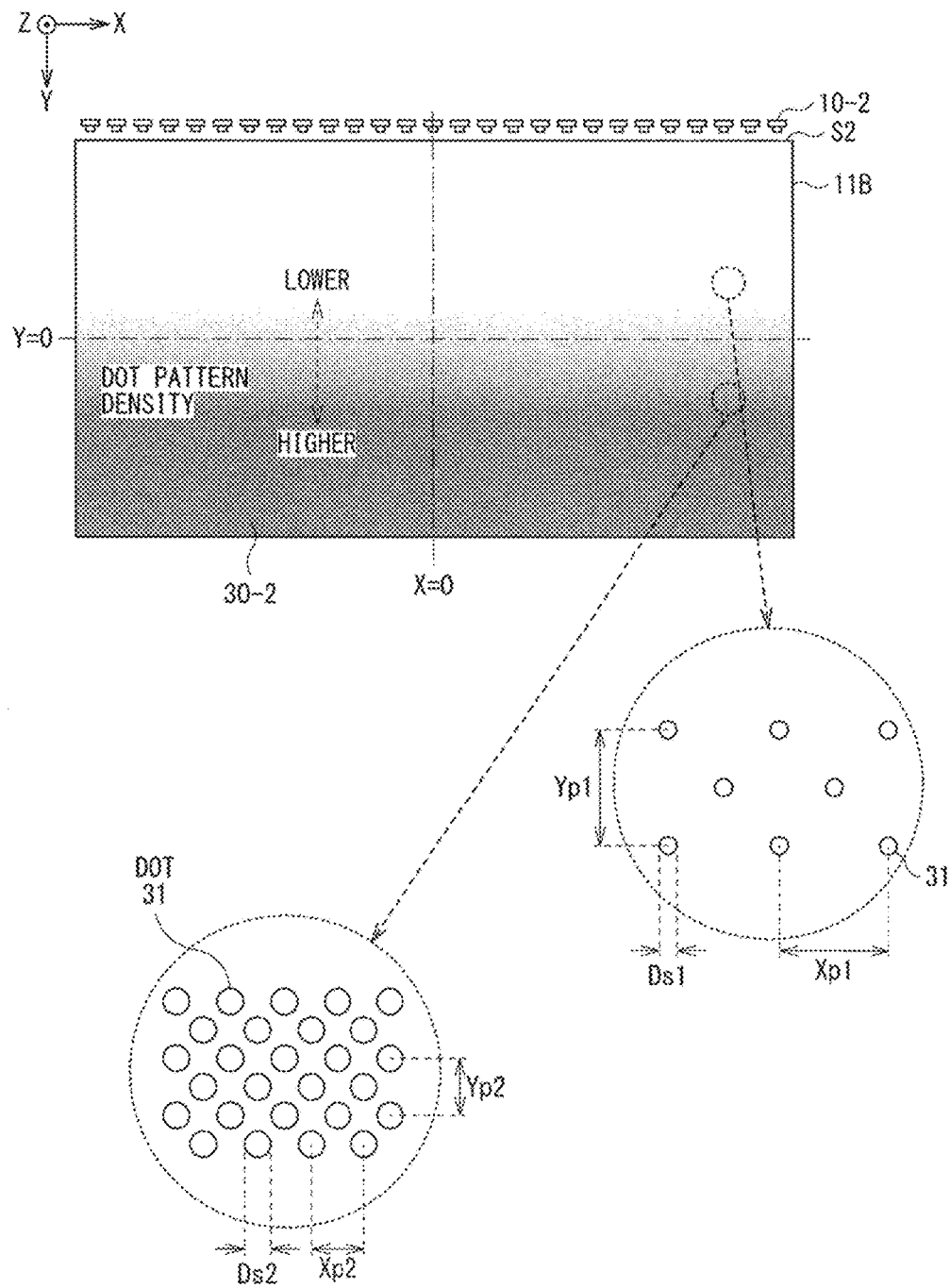

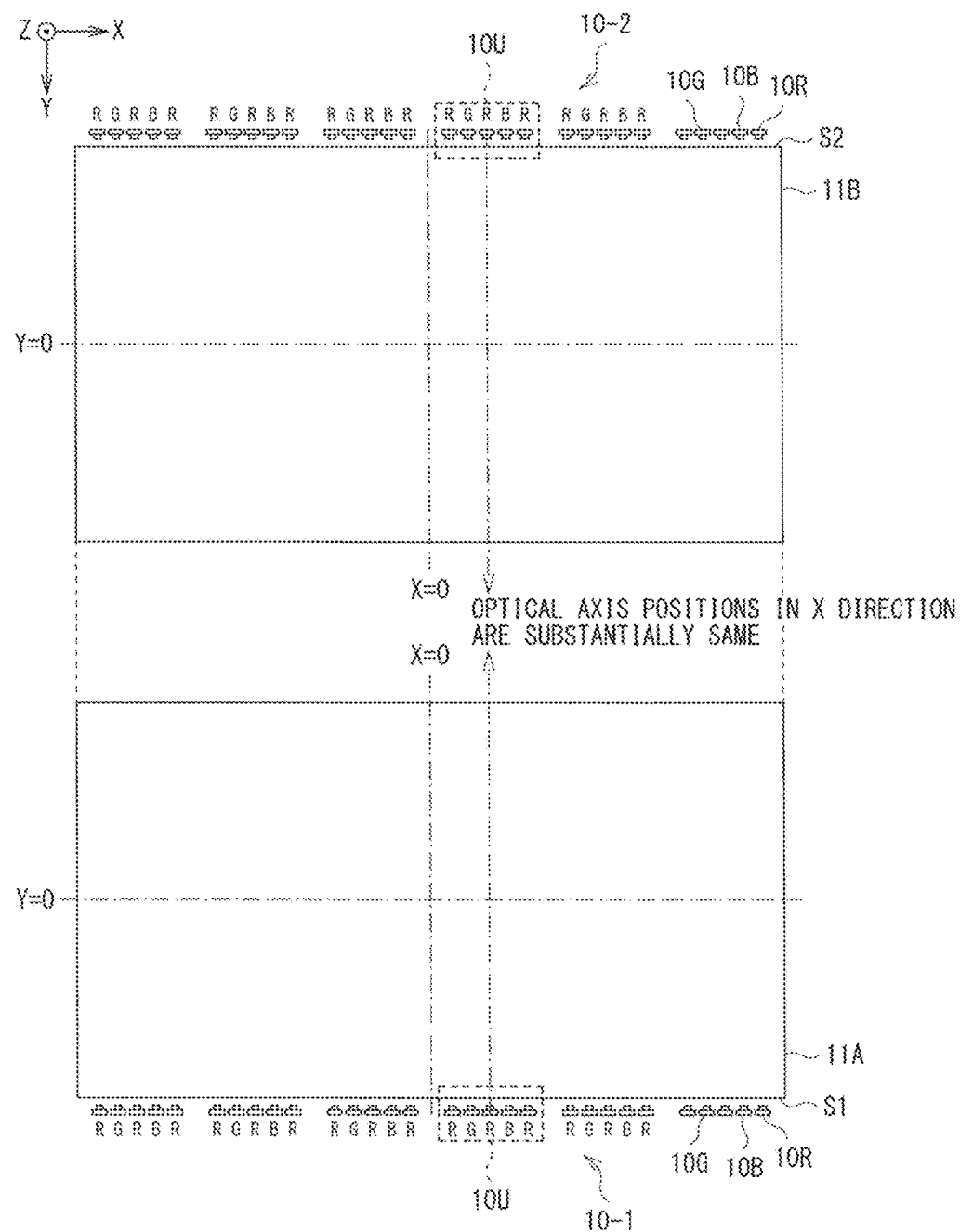

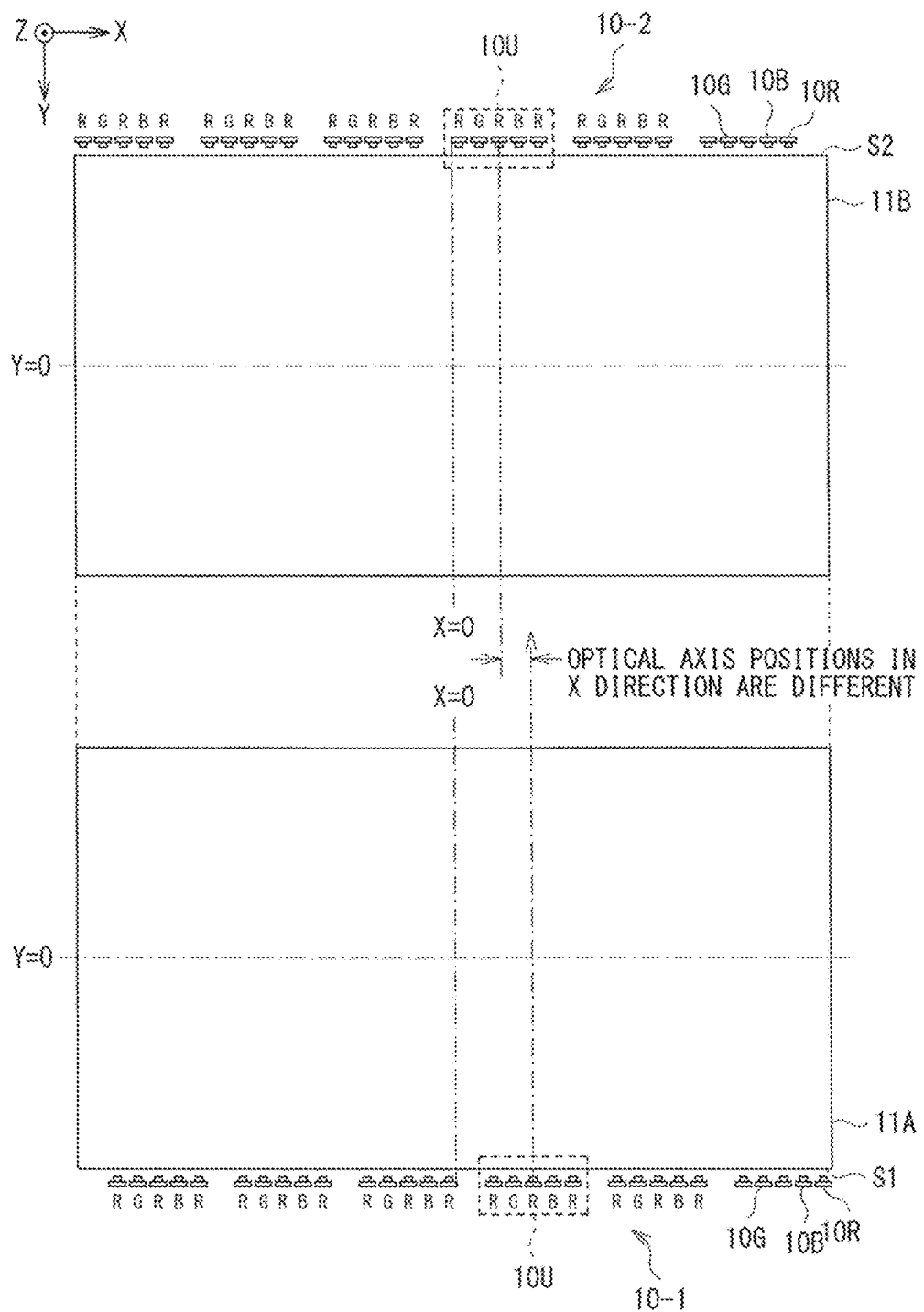
[FIG. 6]

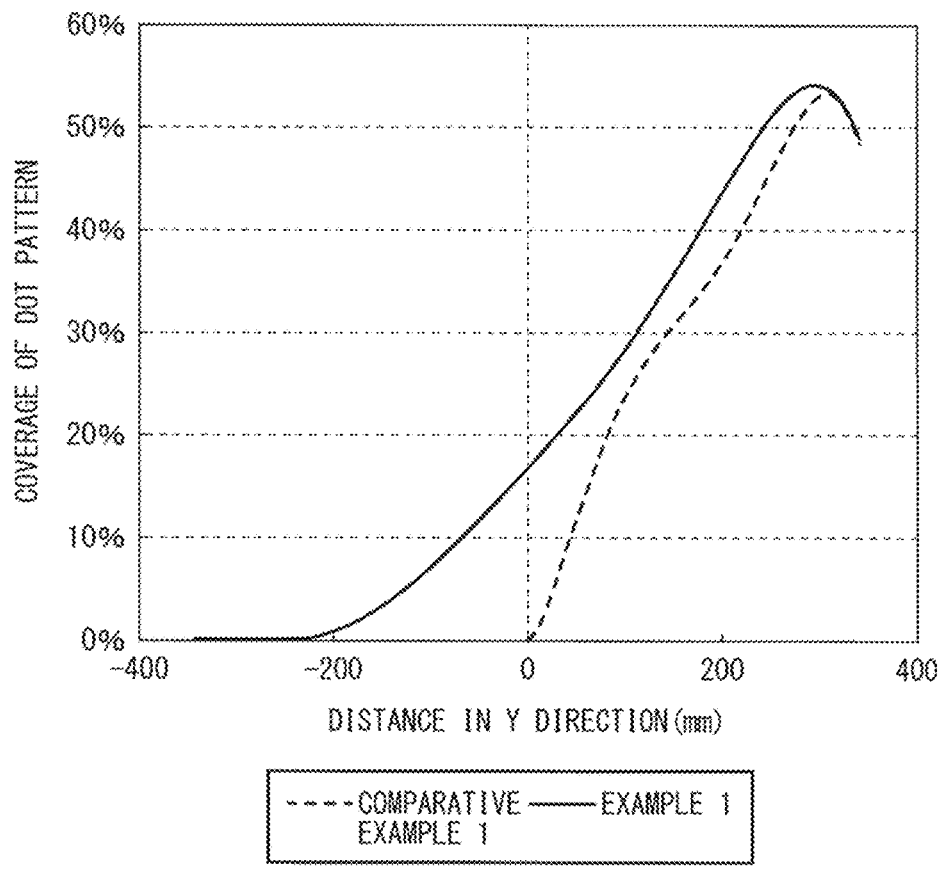

[ FIG. 8 ]
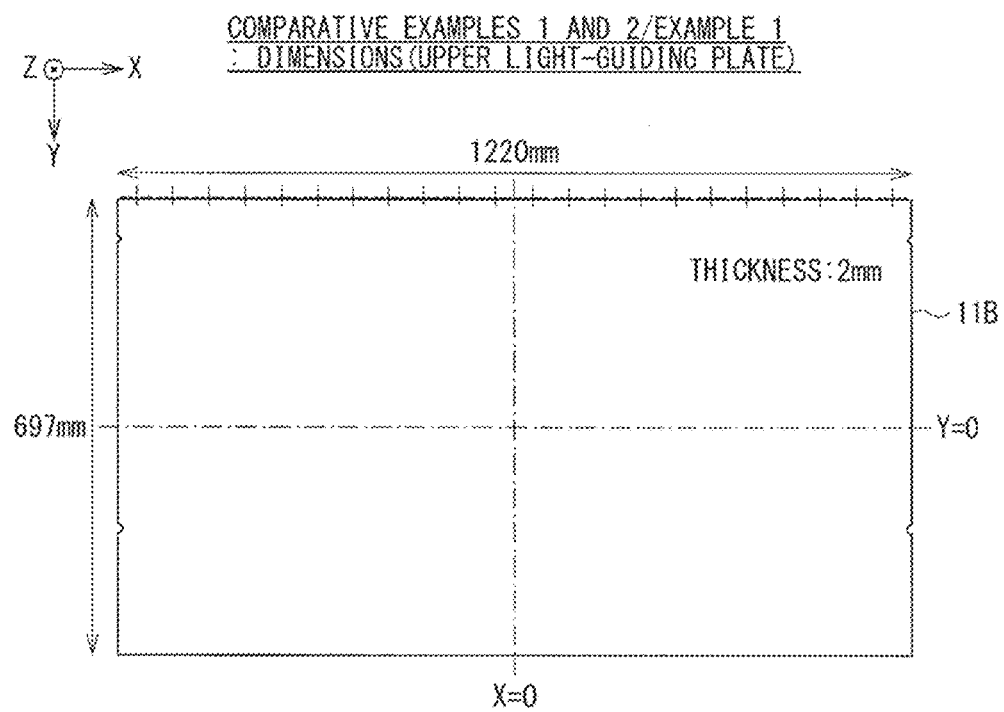

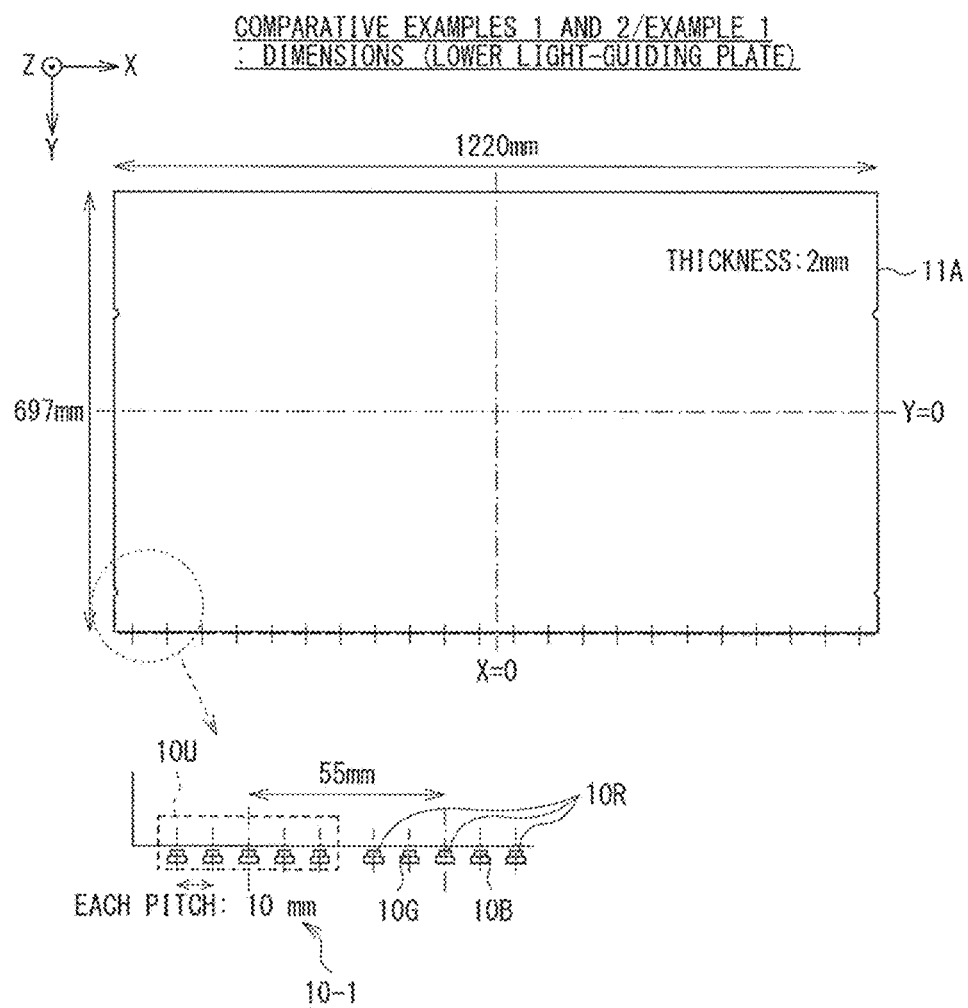

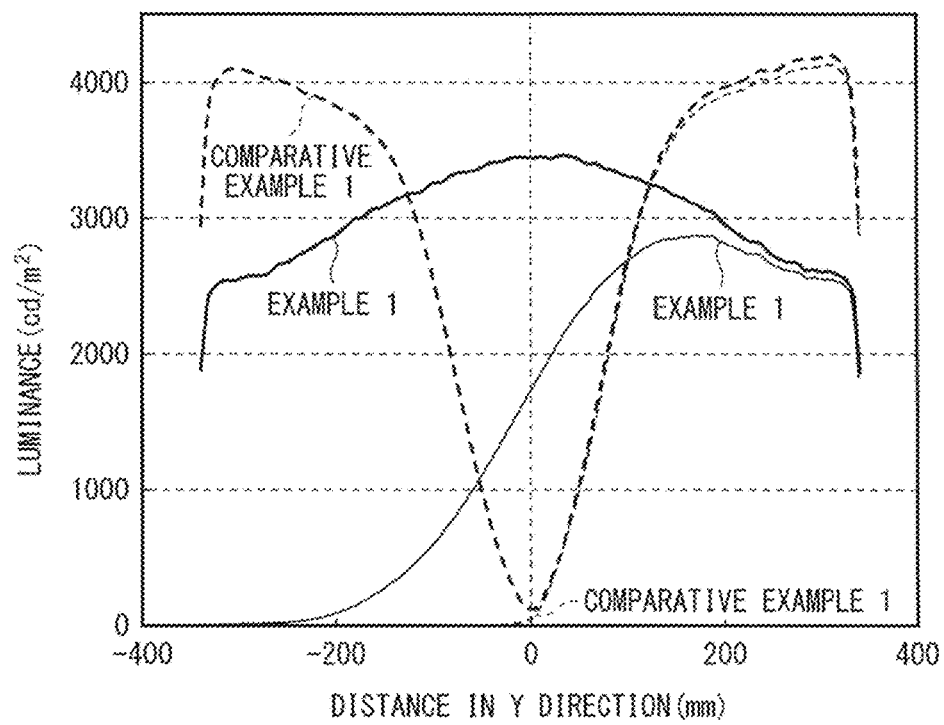

[FIG. 11]
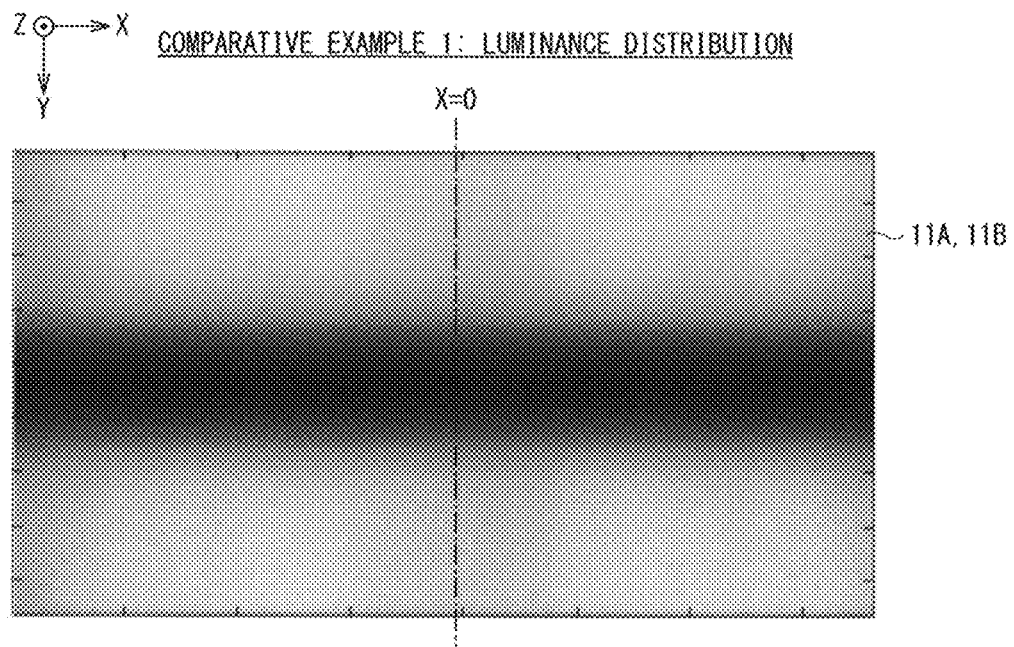
[FIG. 12]
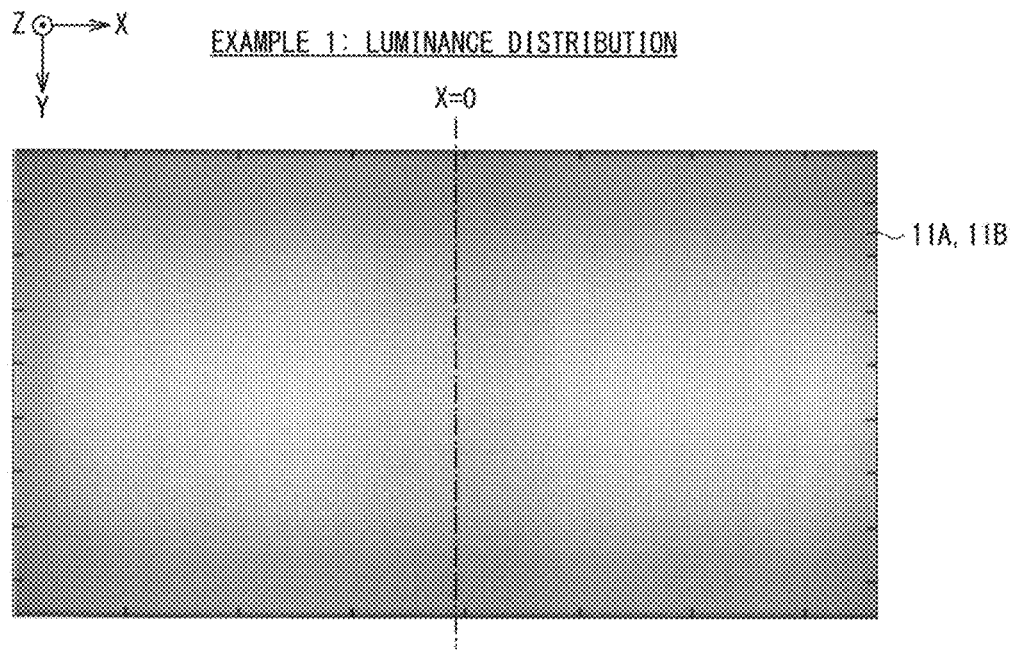

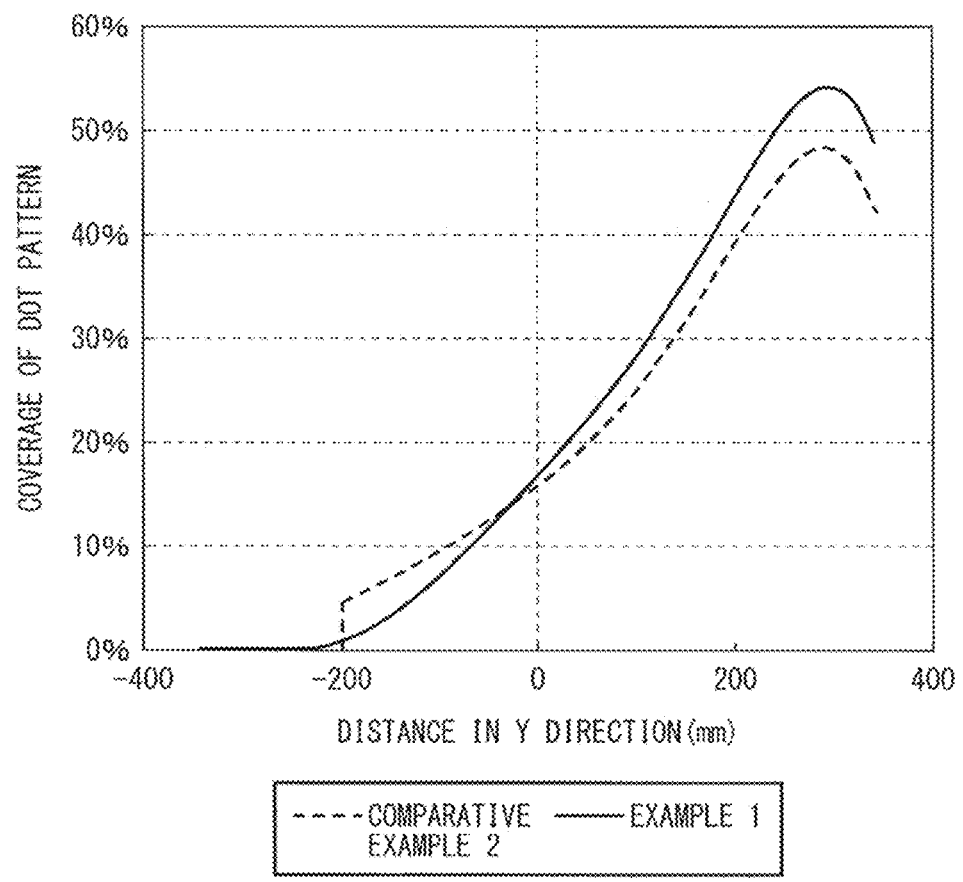
[FIG. 13]

[FIG. 14]
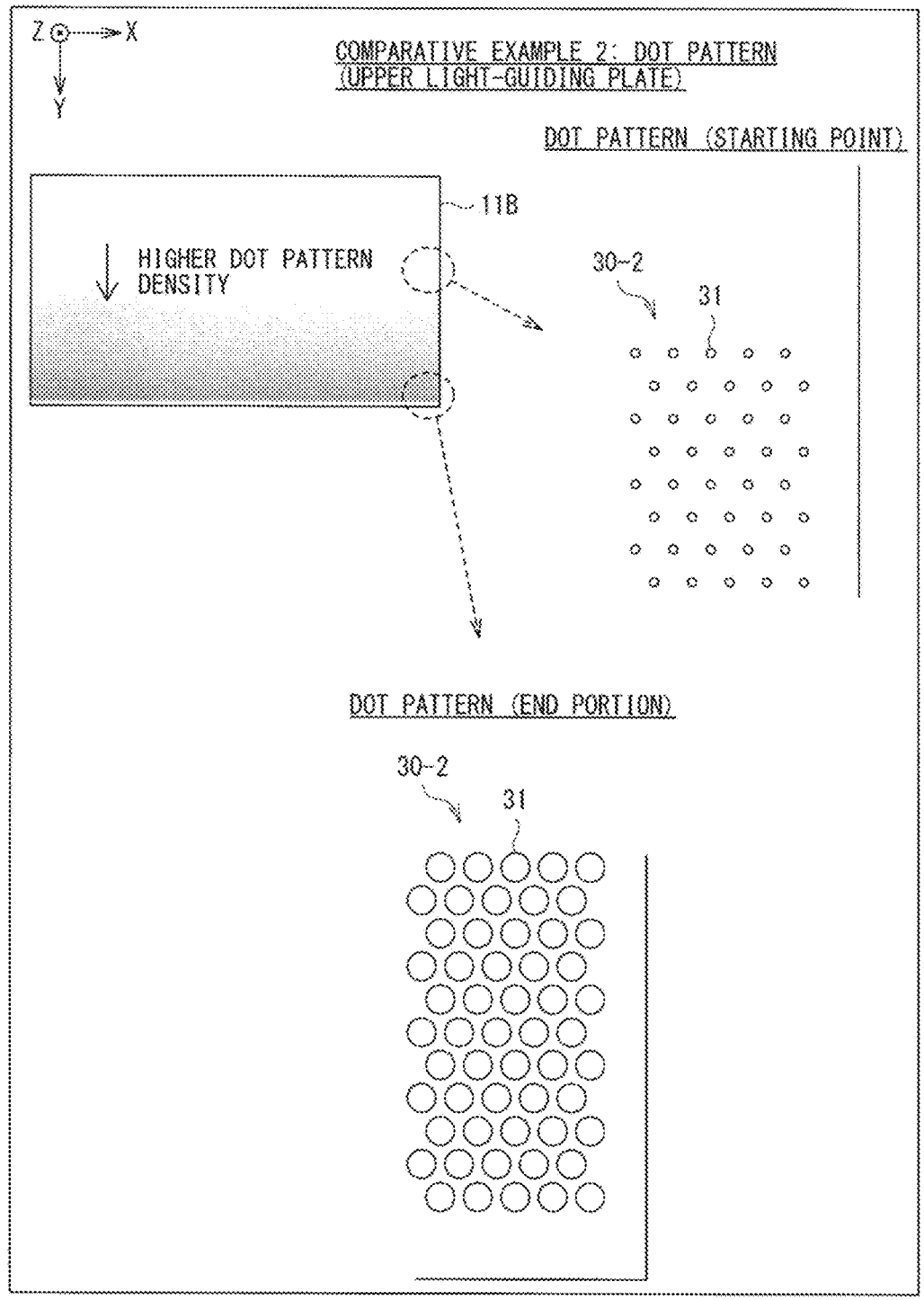

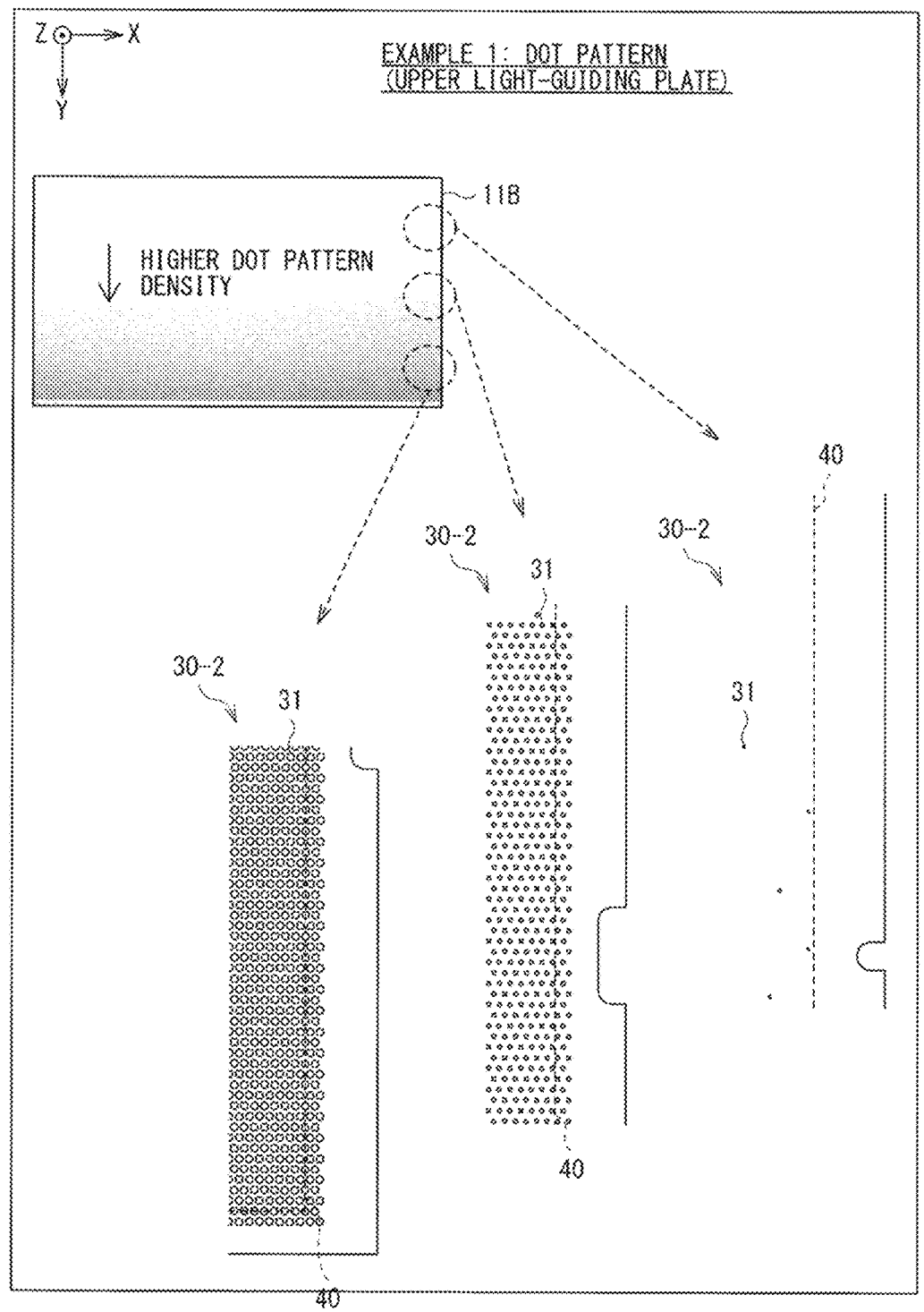

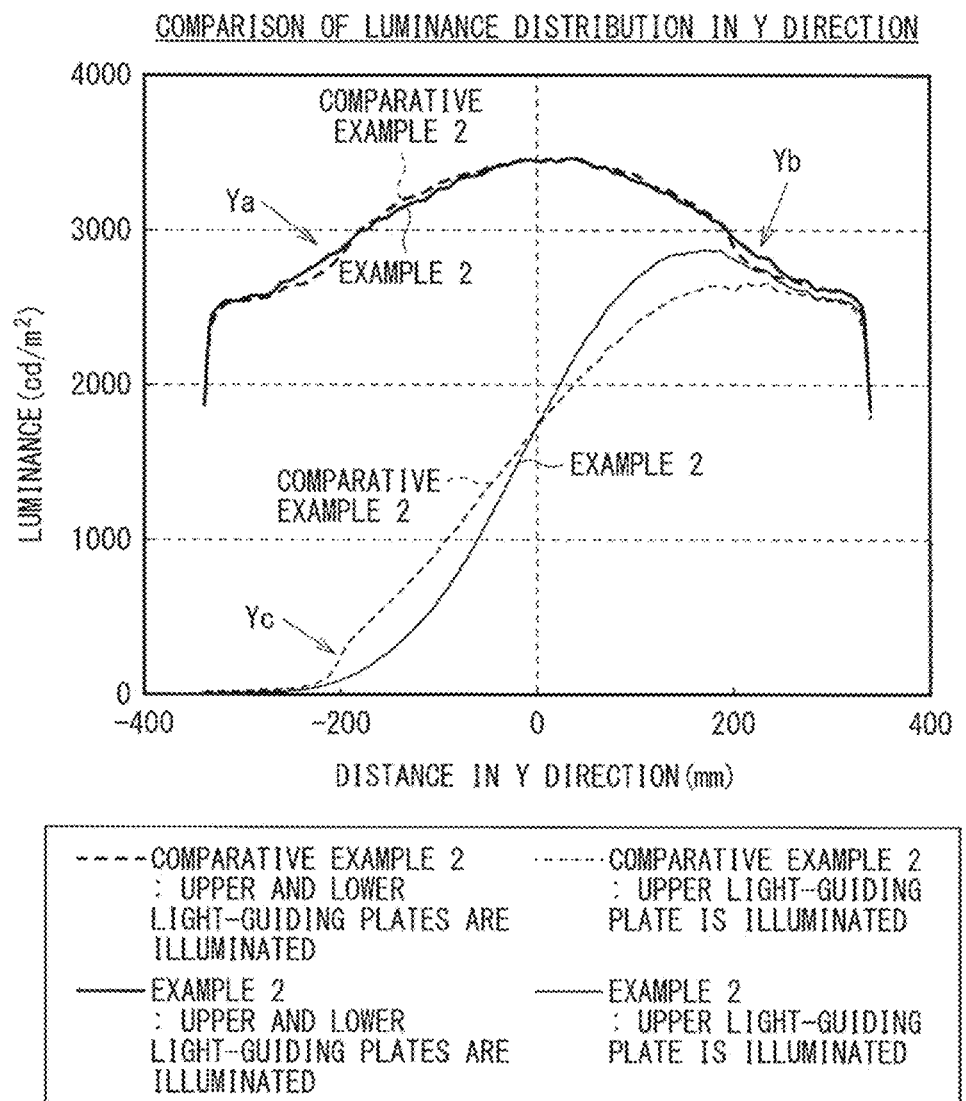
[FIG. 16]

[ FIG. 17 ]
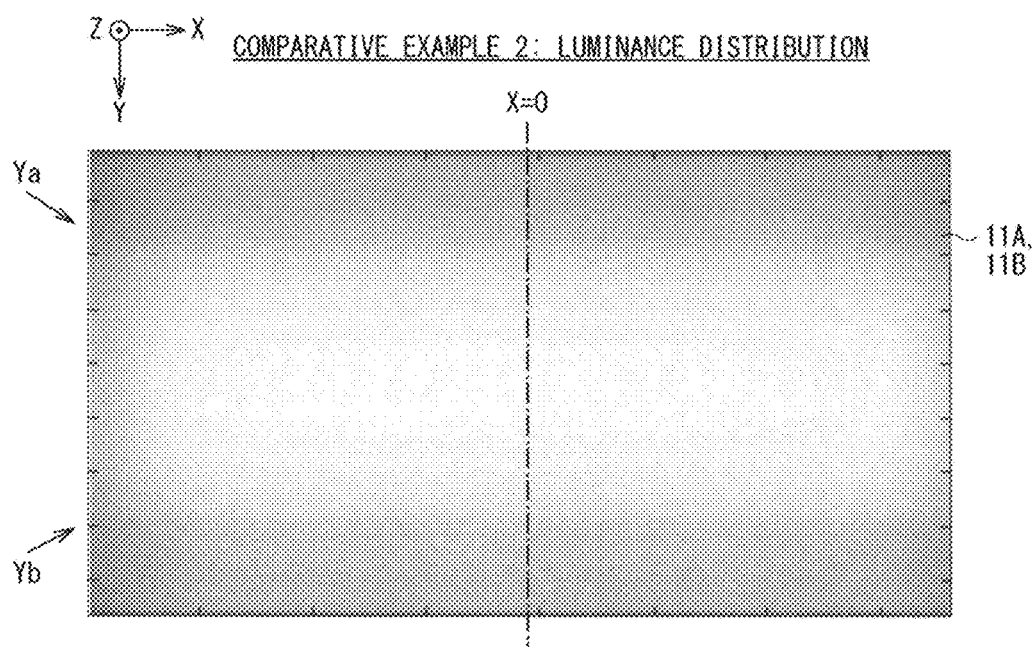

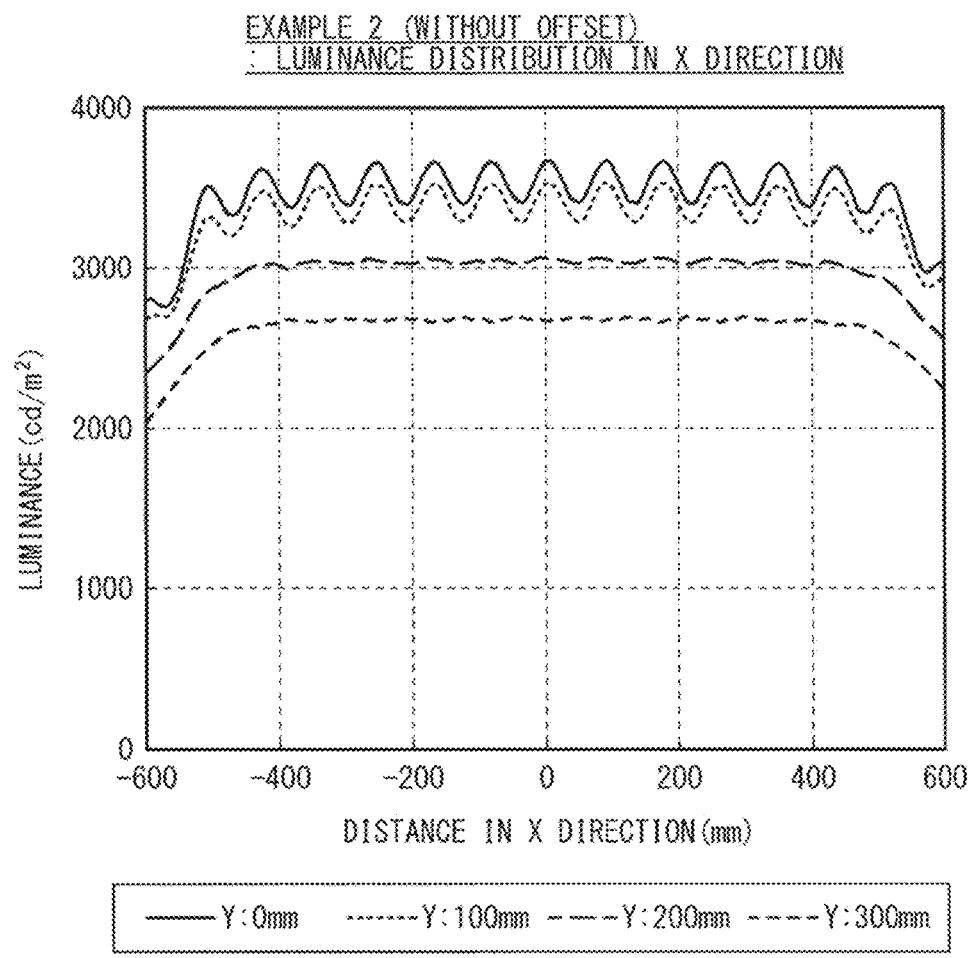
[FIG. 18]

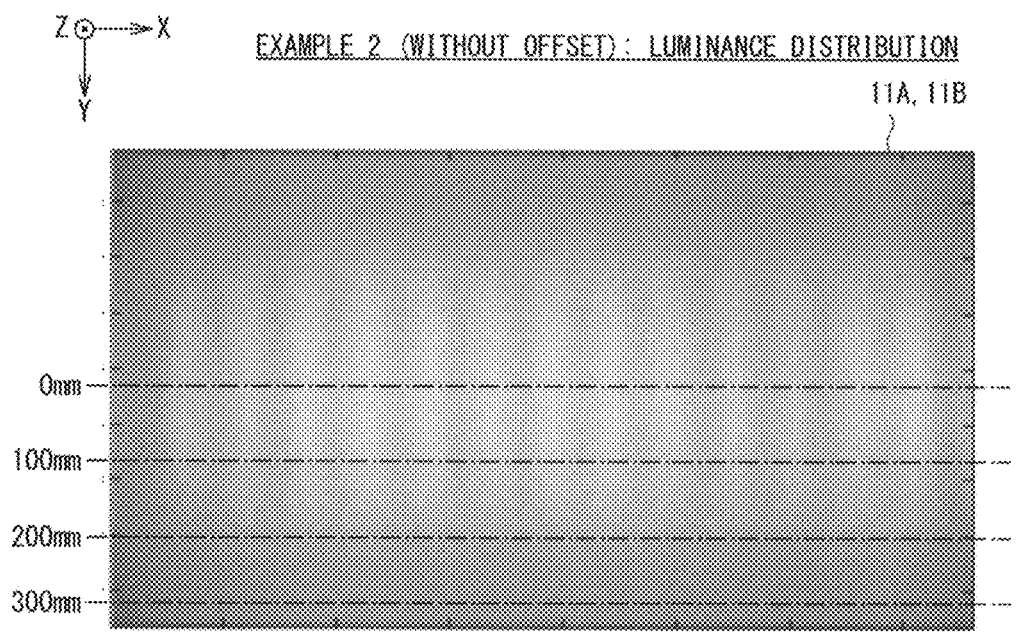

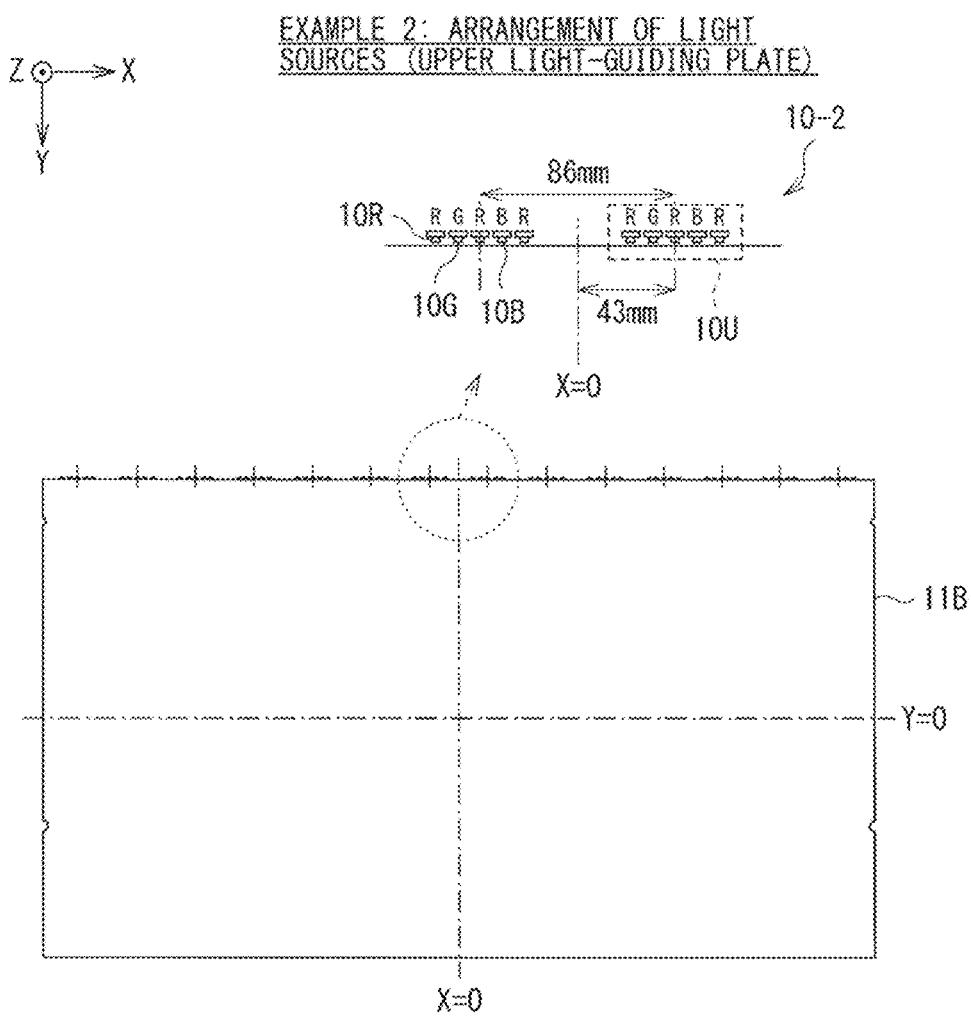

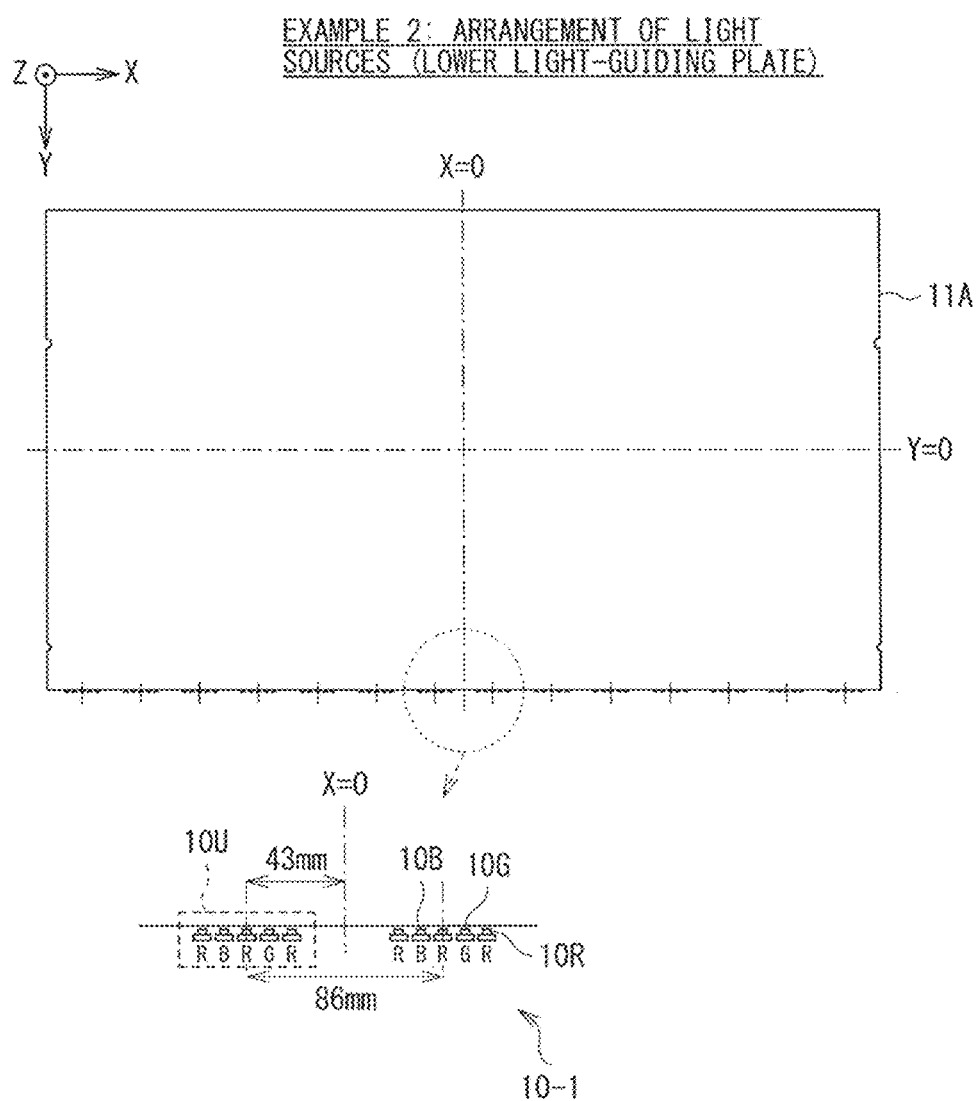

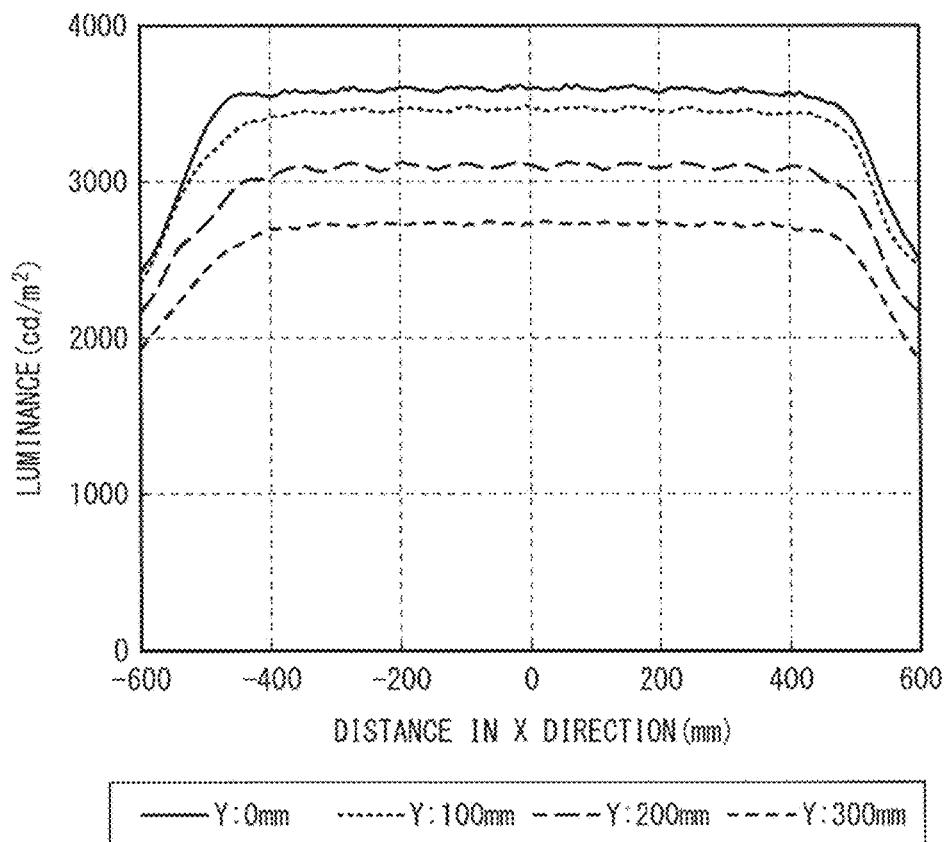

[ FIG. 23 ]
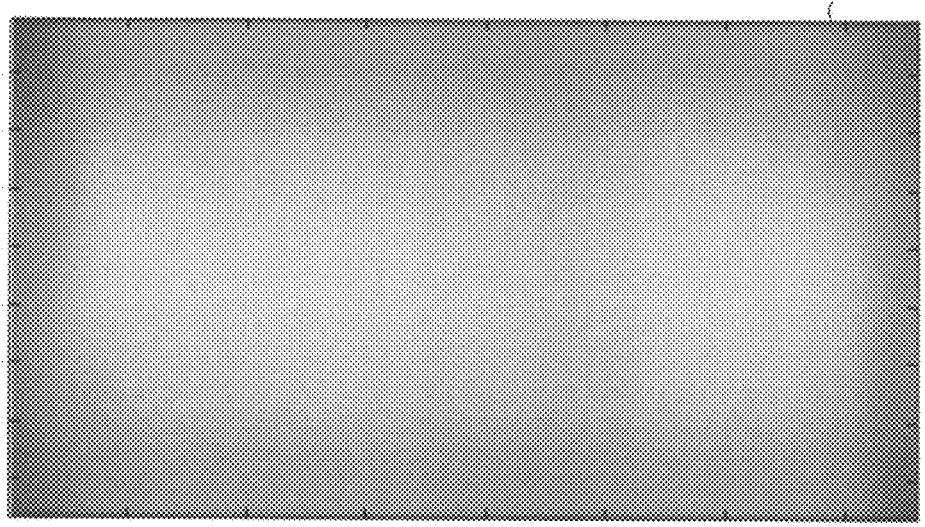

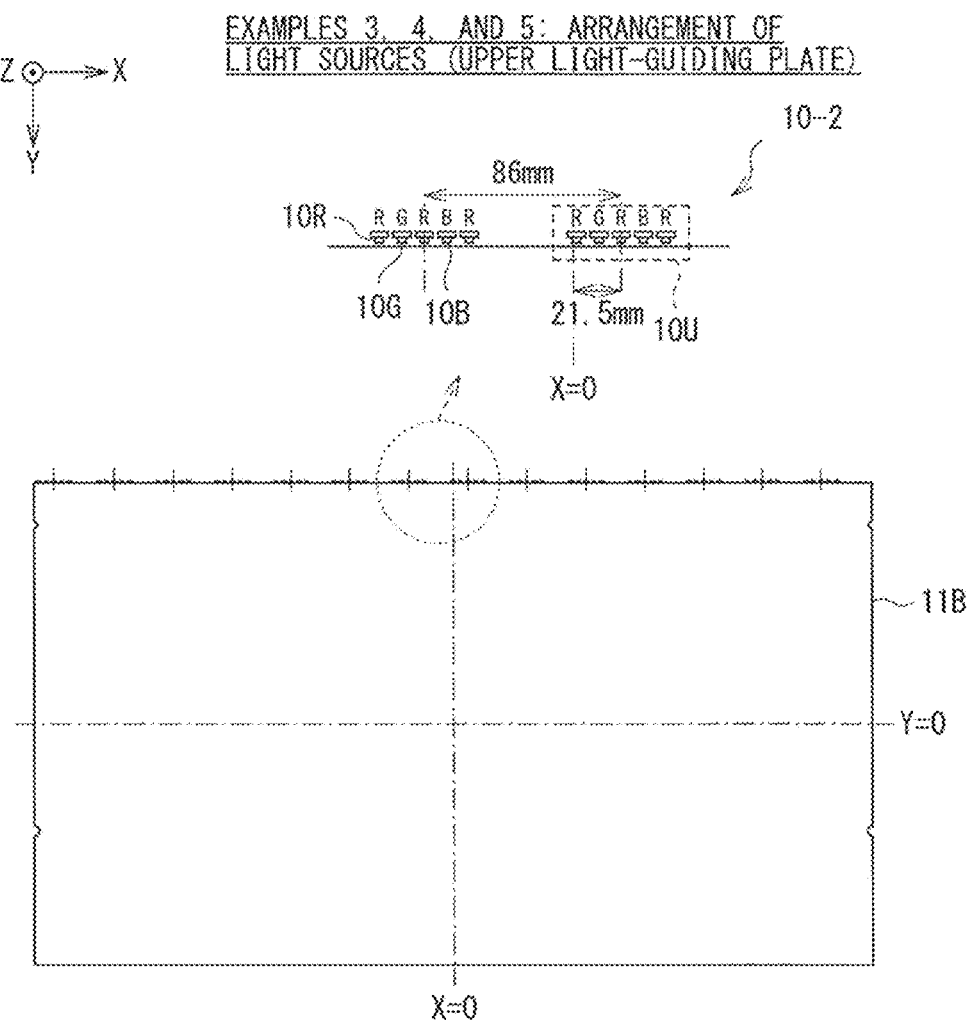
[FIG. 24]

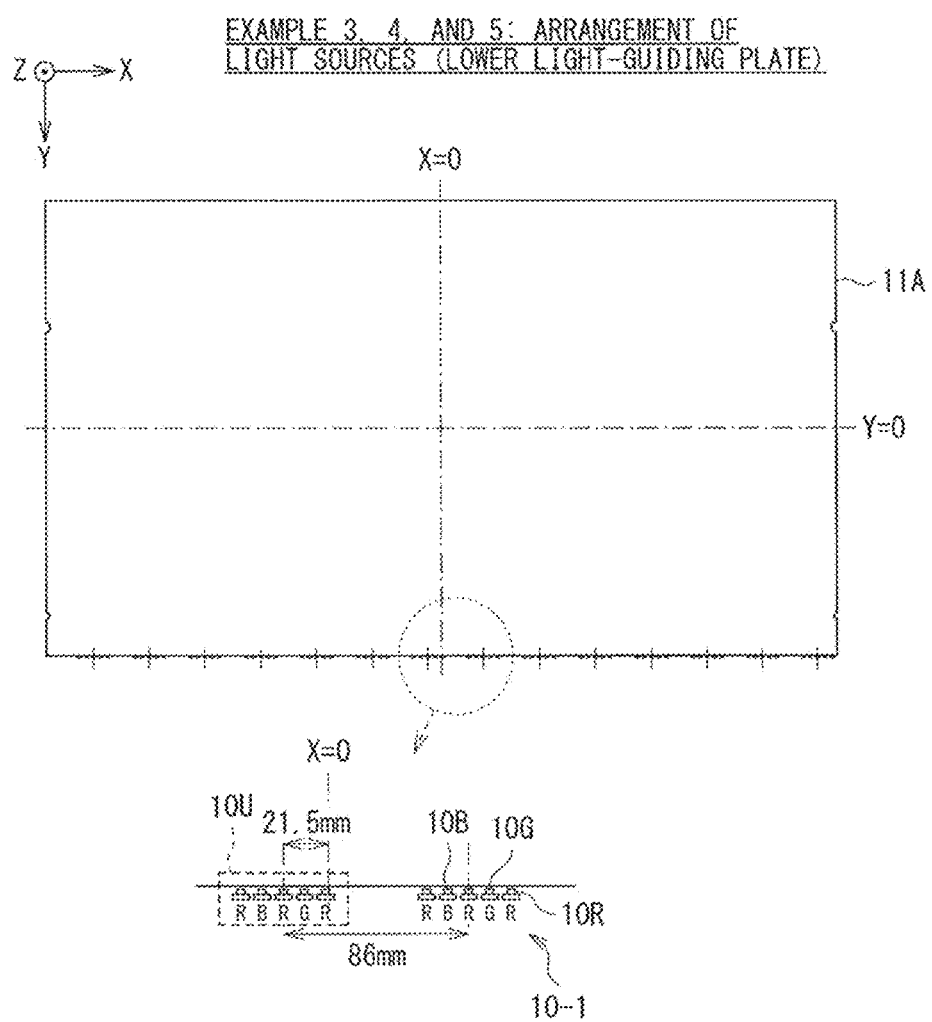

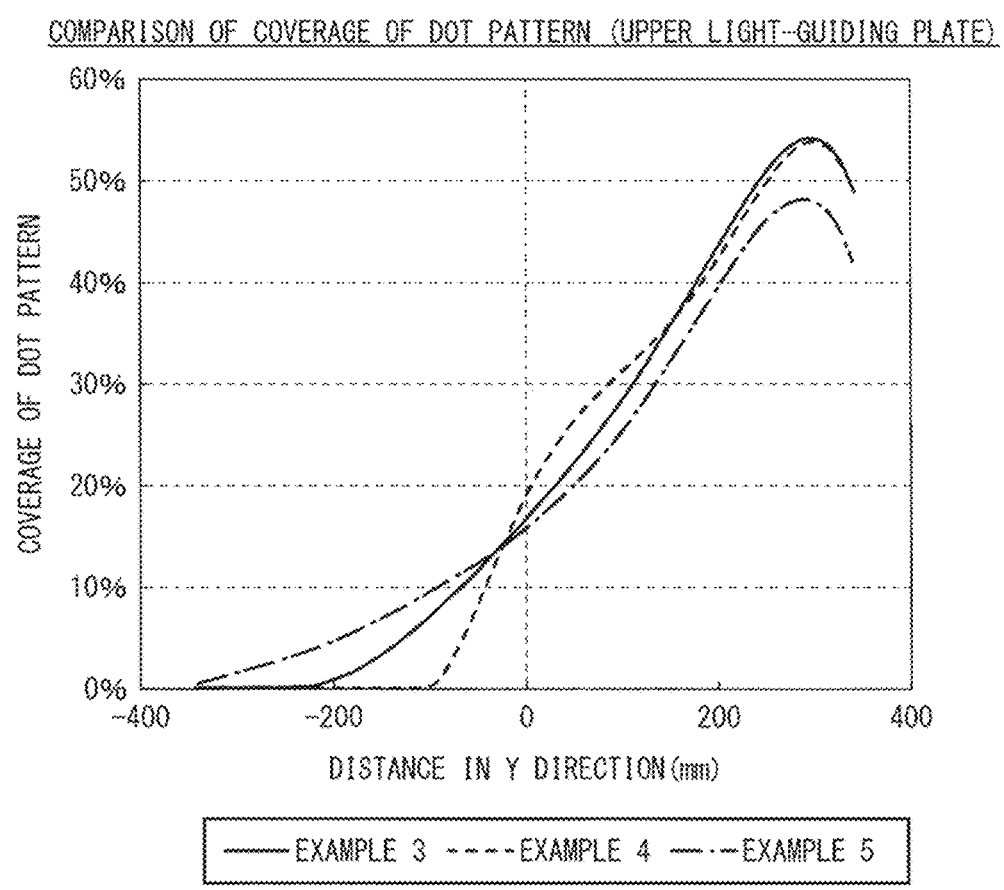
[FIG. 26]

[ FIG. 27 ]
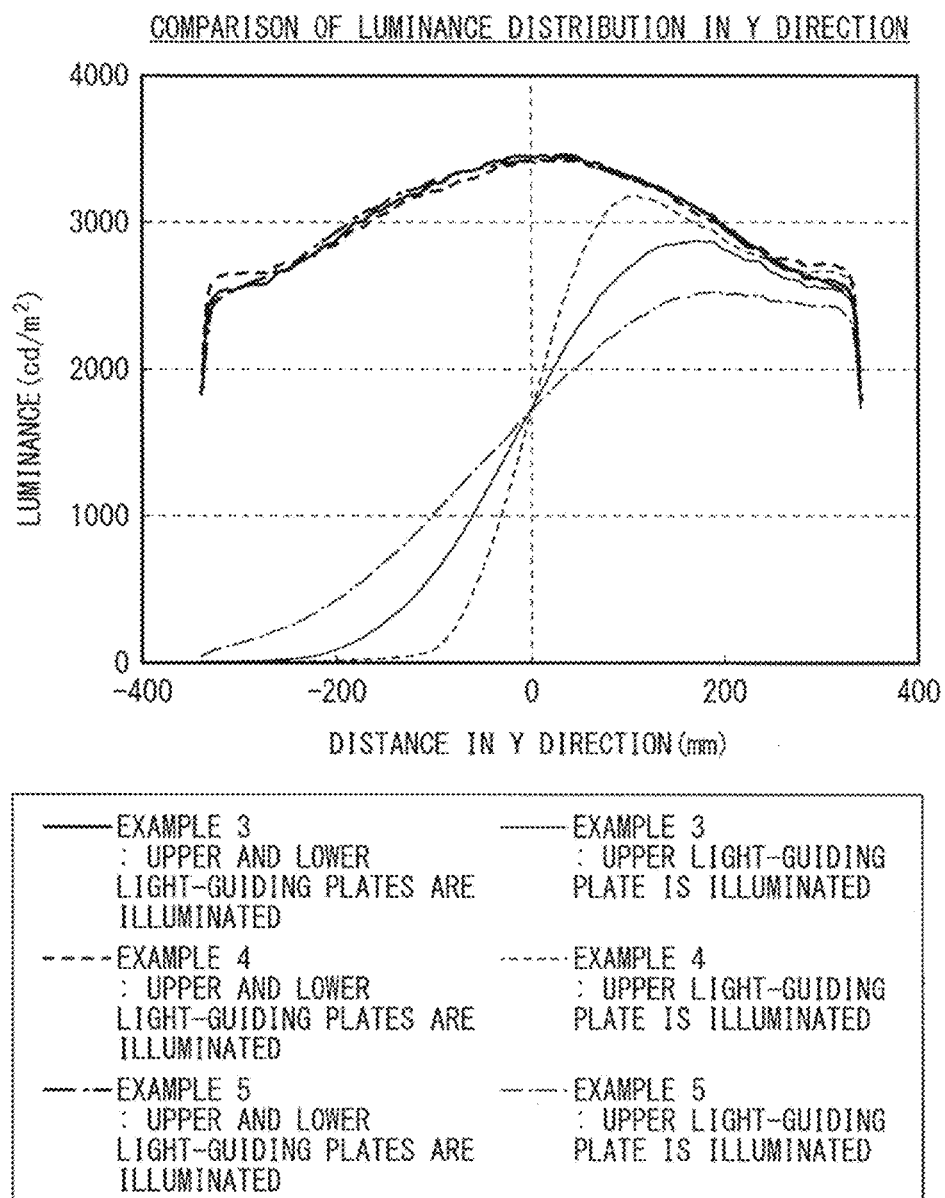

[FIG. 28]
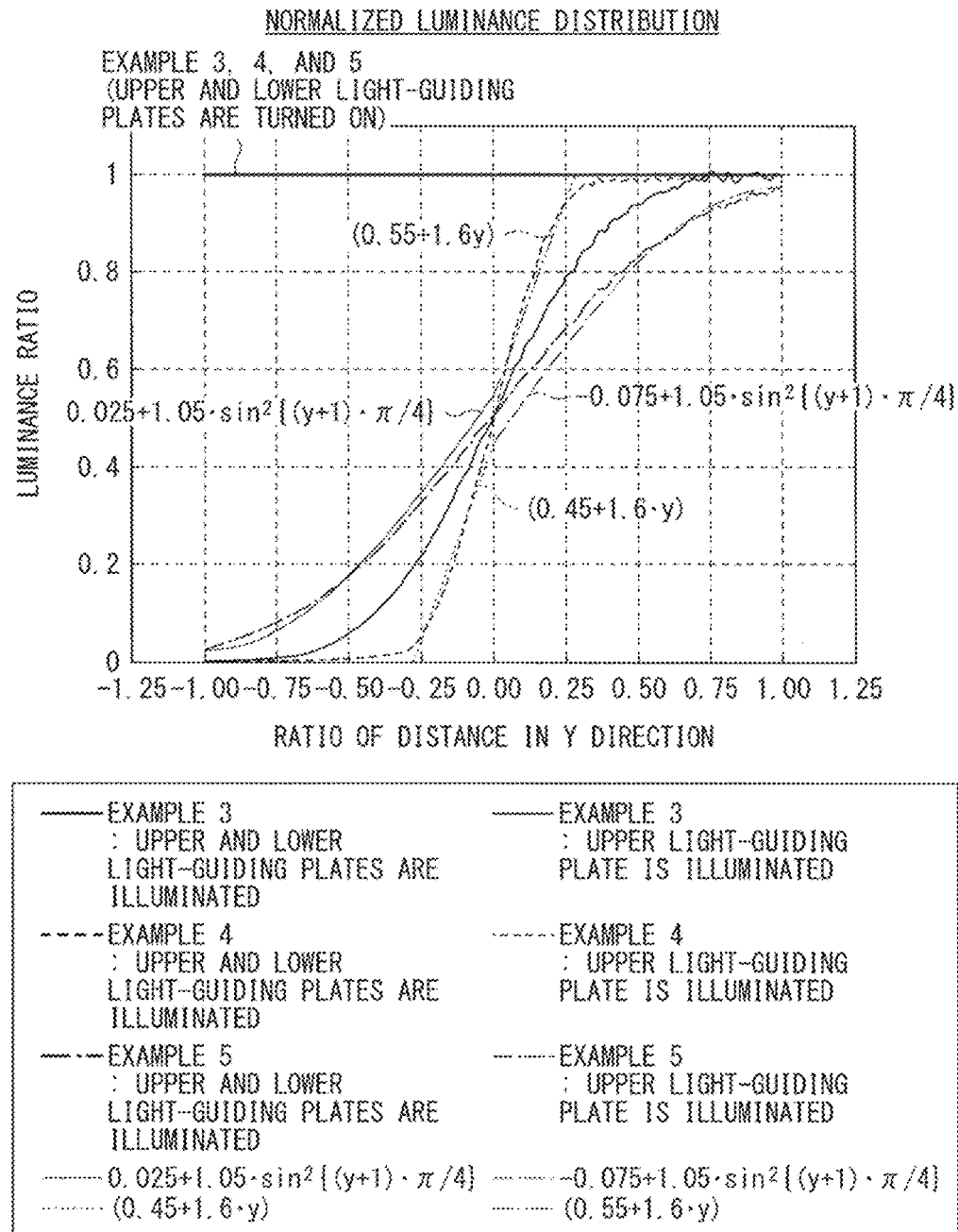

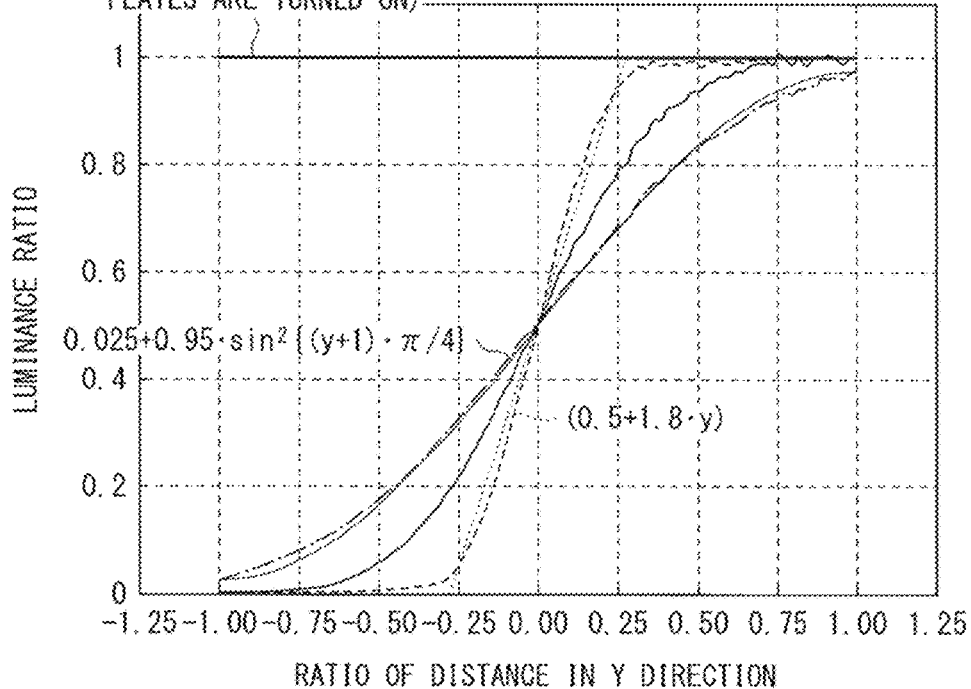
[ FIG. 29 ]

[FIG. 30]
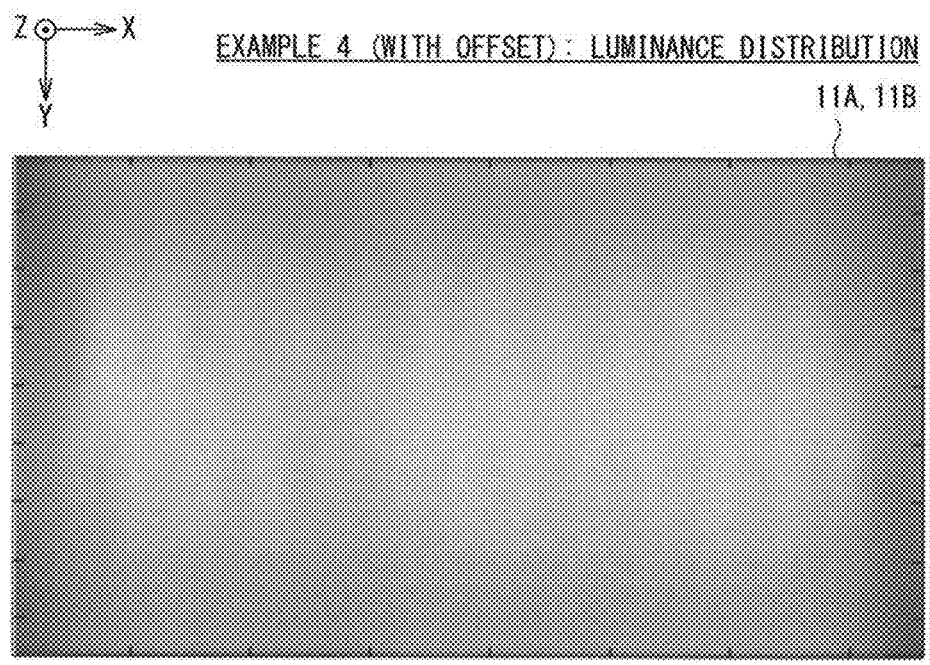

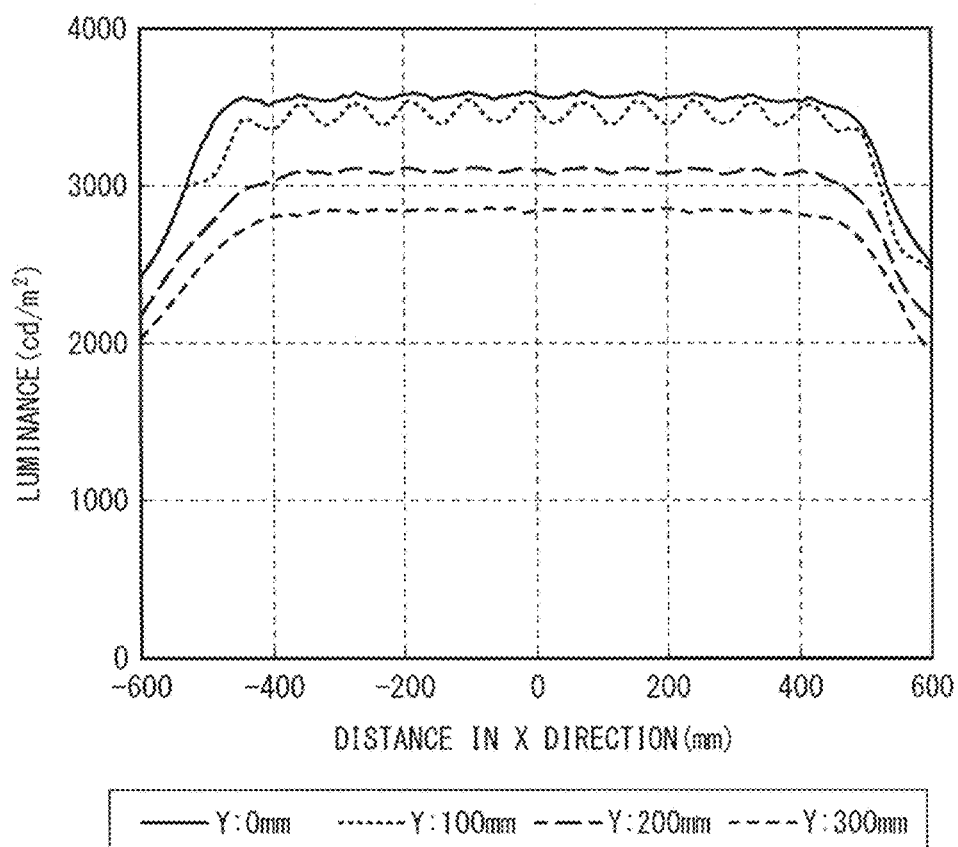

[FIG. 32]
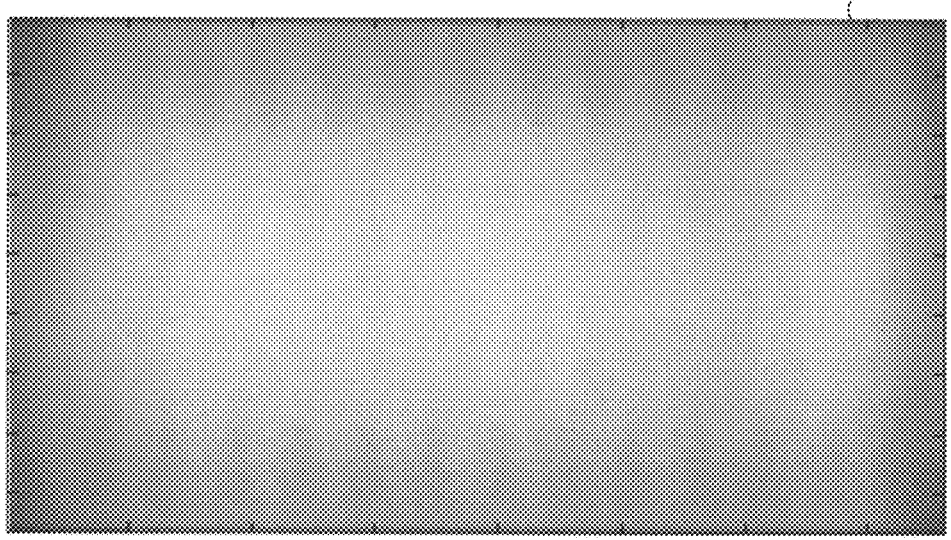

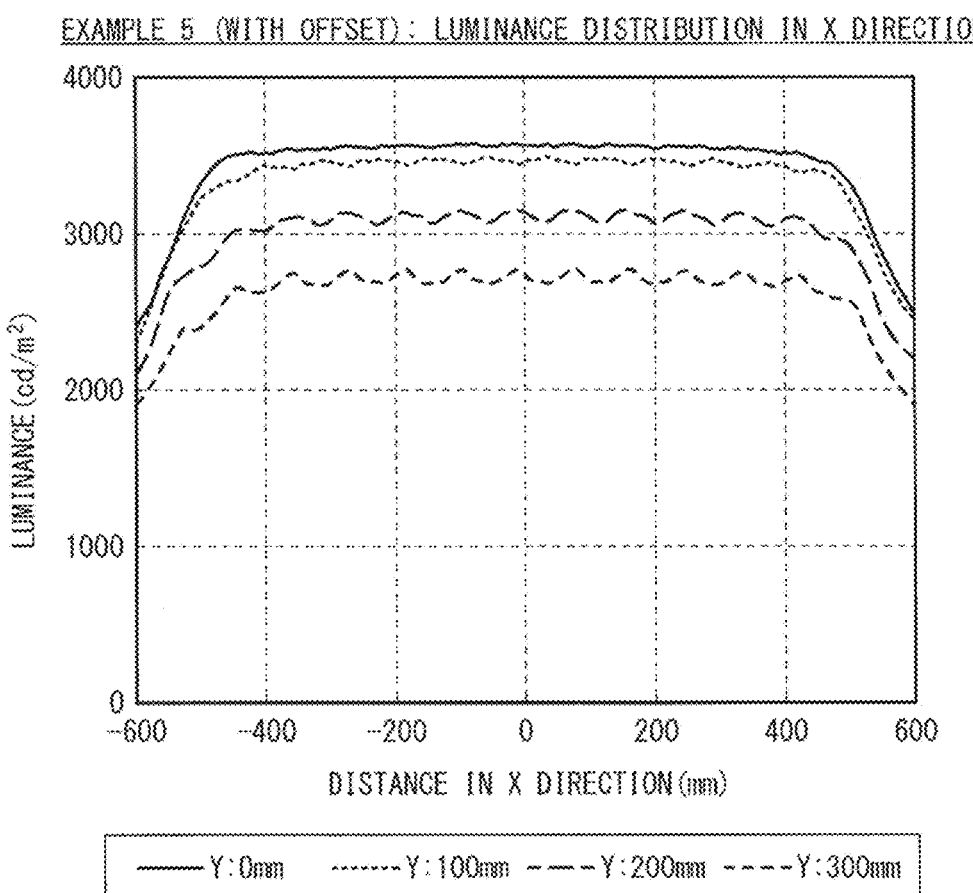
[FIG. 33]

[ FIG. 34 ]
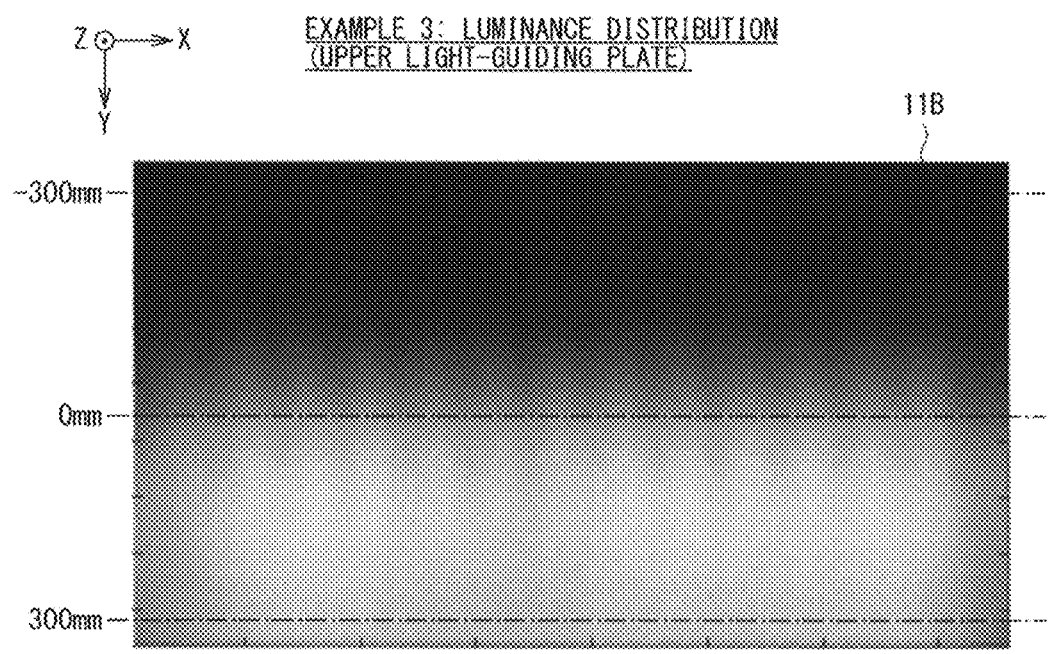

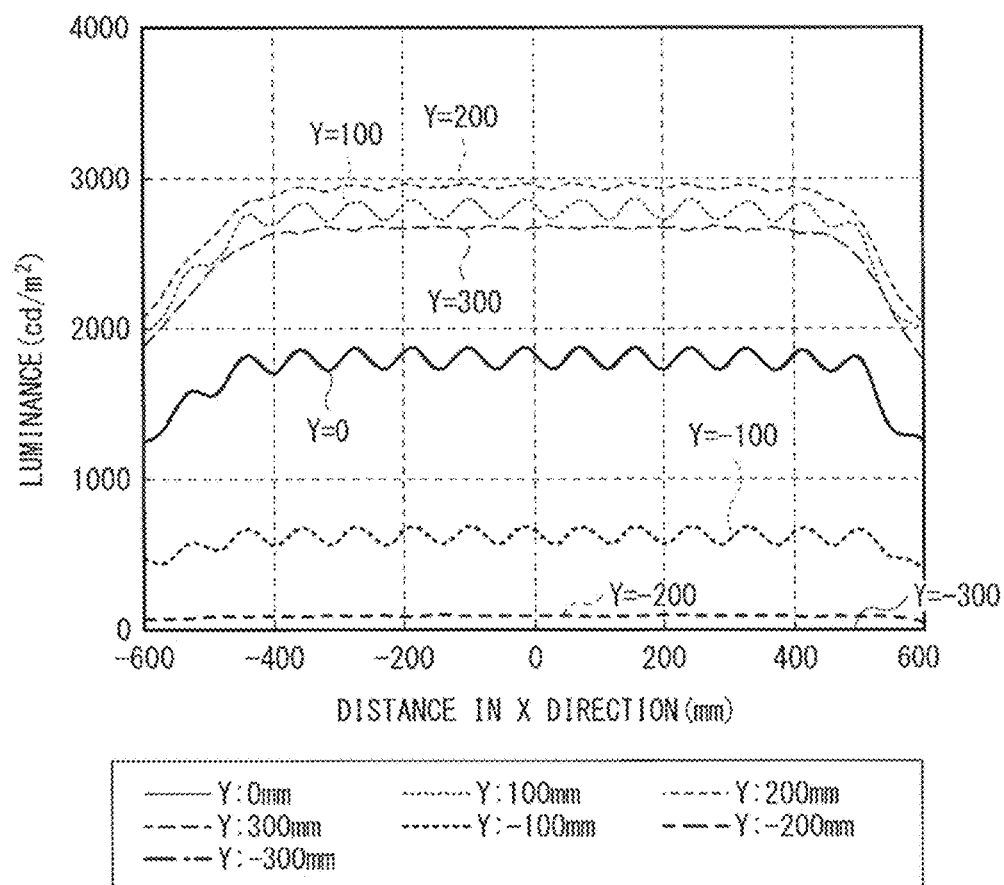

[ FIG. 36 ]
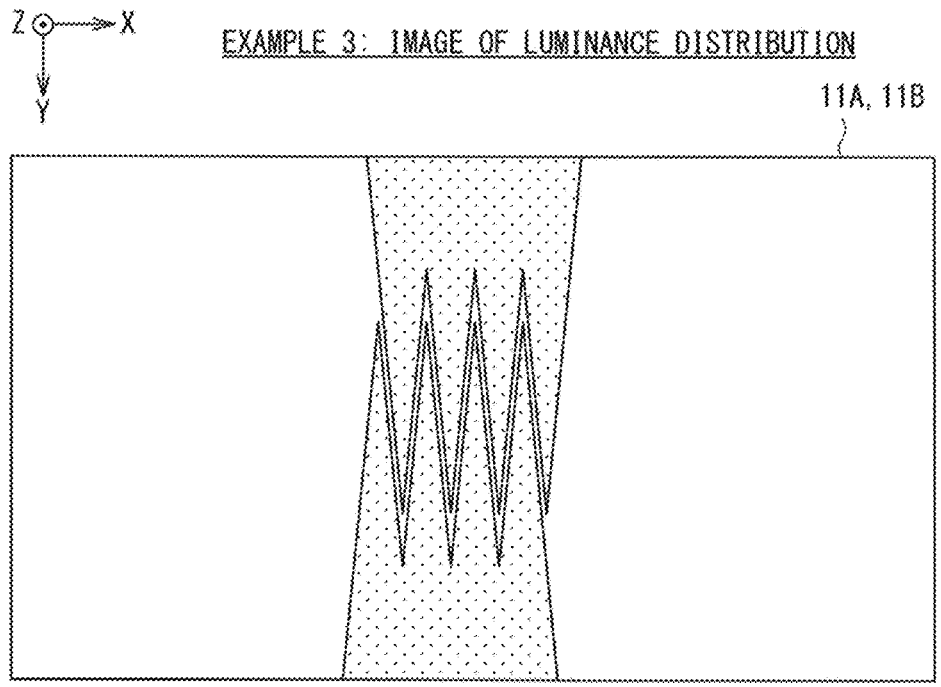
EXAMPLE 3: IMAGE OF LUMINANCE DISTRIBUTION
[ FIG. 37 ]
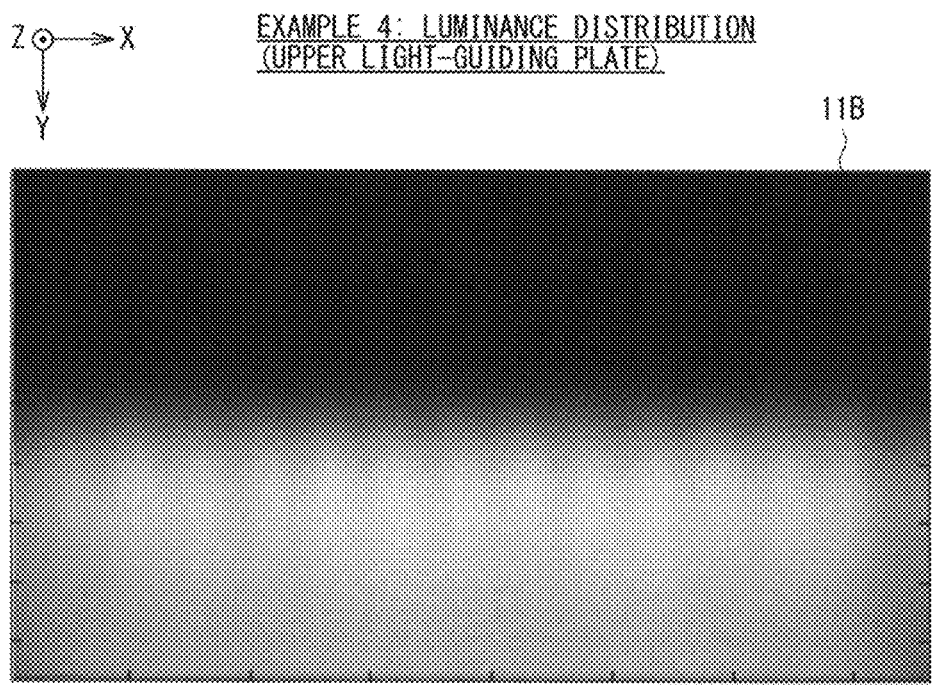
EXAMPLE 4: LUMINANCE DISTRIBUTION (UPPER LIGHT-GUIDING PLATE)

[ FIG. 38 ]
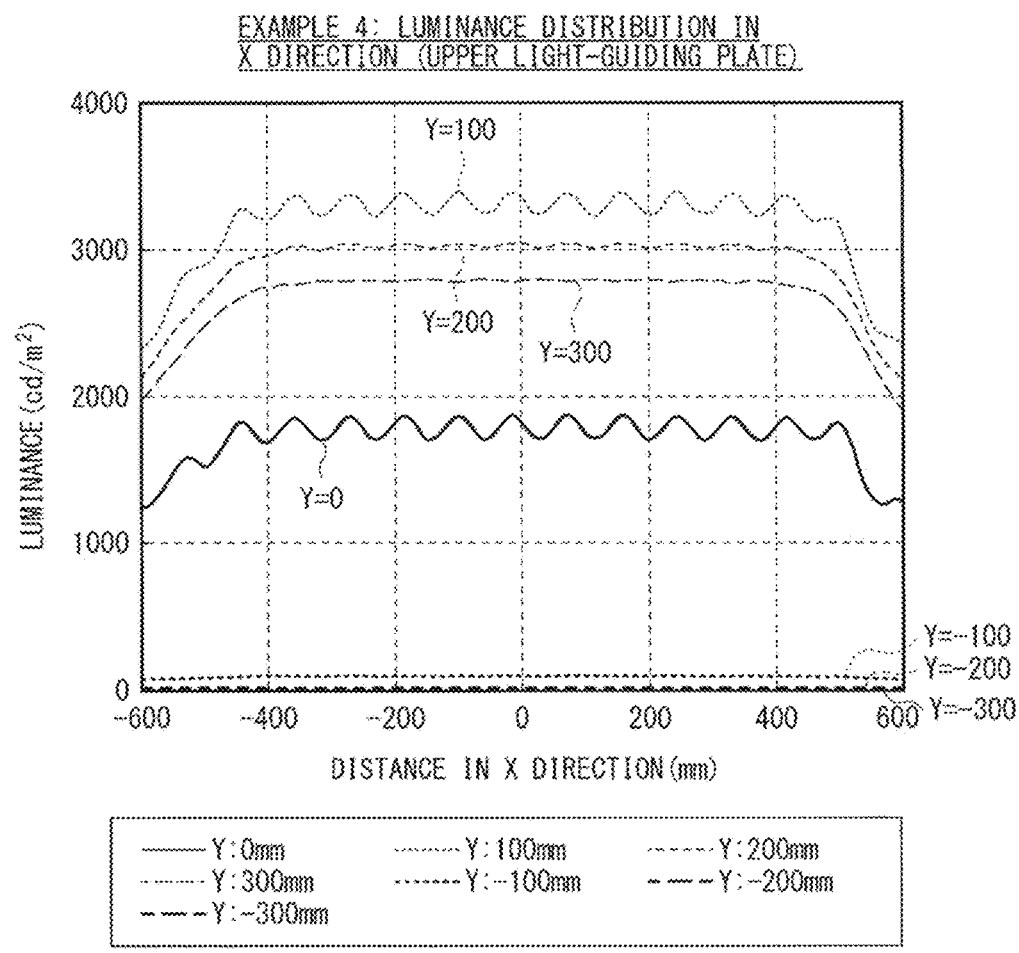

[ FIG. 39 ]
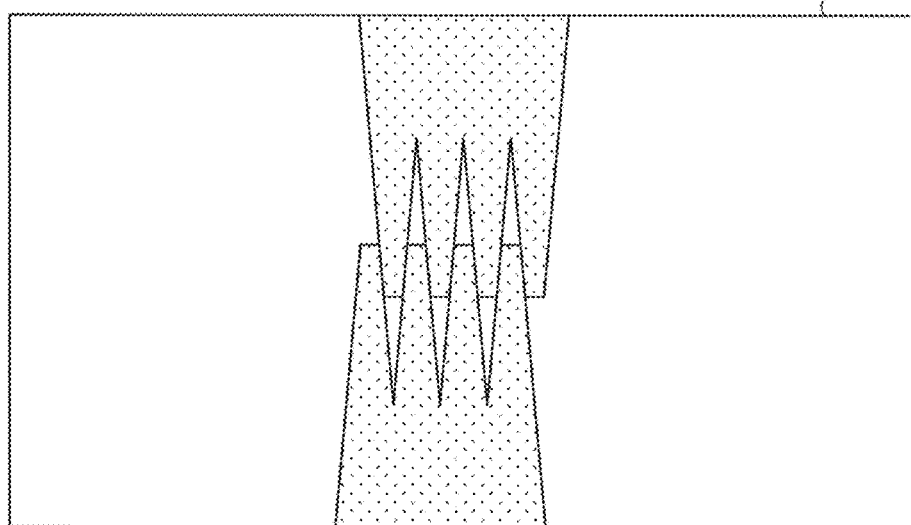
EXAMPLE 4: IMAGE OF LUMINANCE DISTRIBUTION
[ FIG. 40 ]
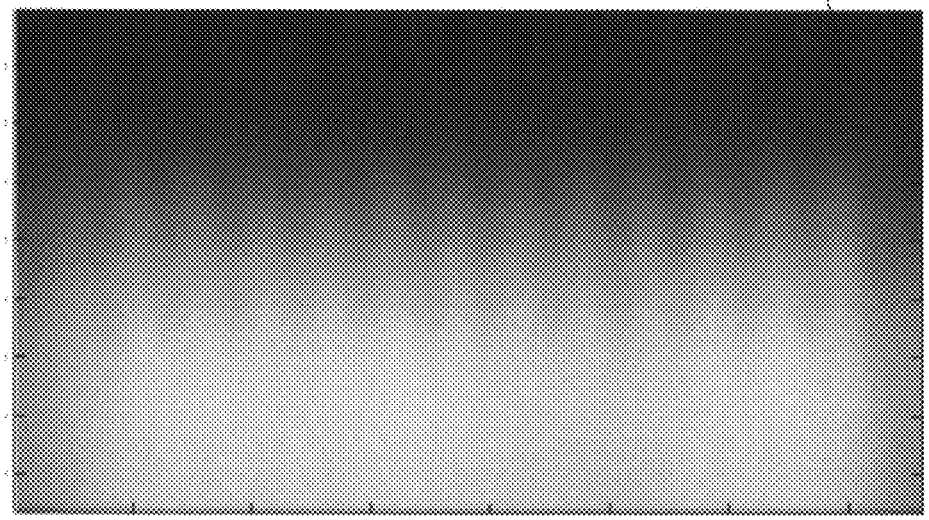
EXAMPLE 5: LUMINANCE DISTRIBUTION (UPPER LIGHT-GUIDING PLATE)

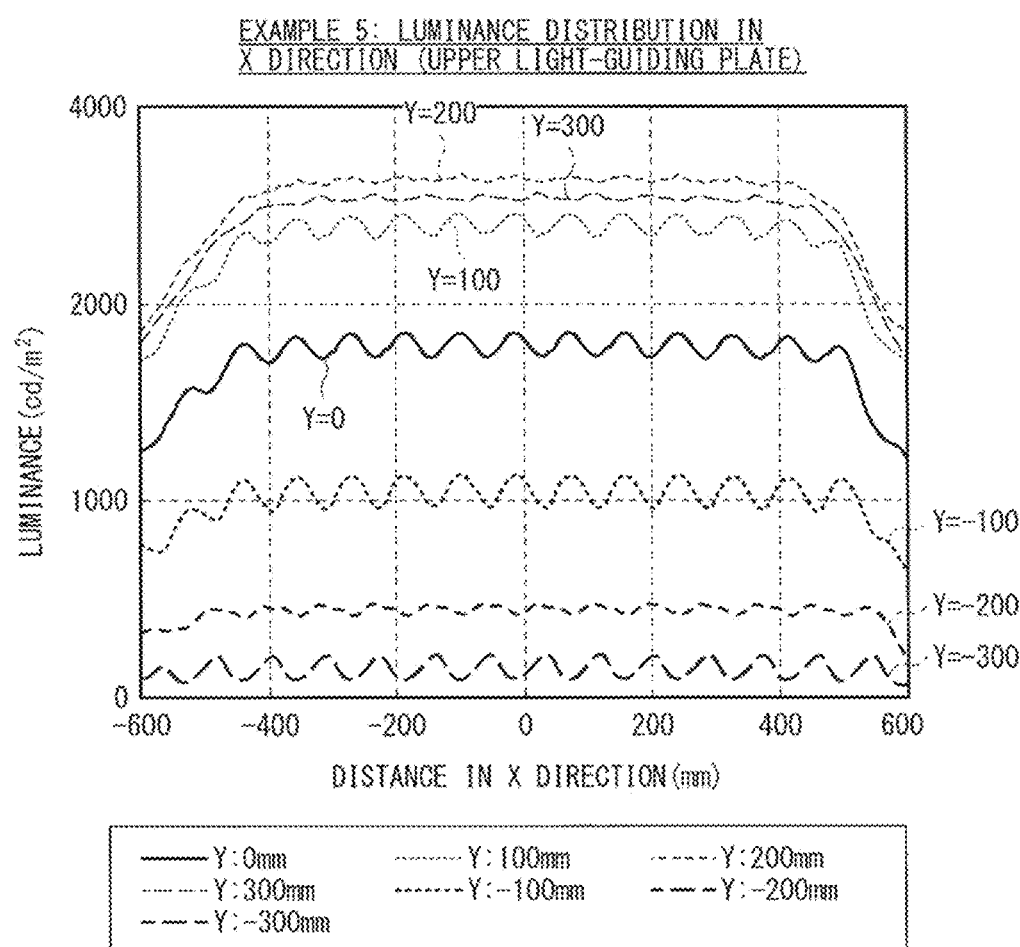

[FIG. 42]
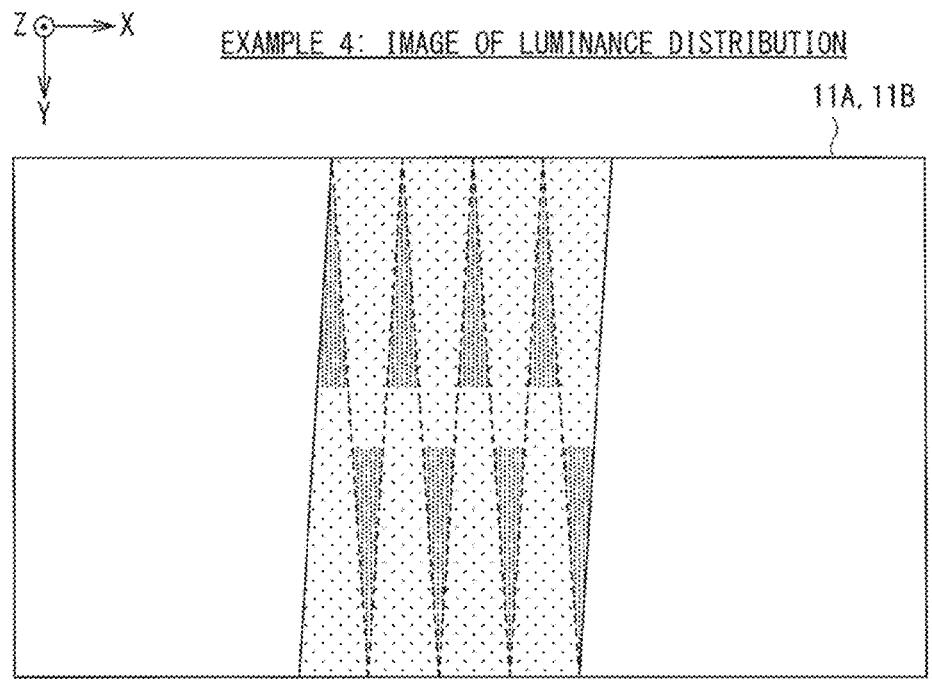
EXAMPLE 4: IMAGE OF LUMINANCE DISTRIBUTION
[FIG. 43]
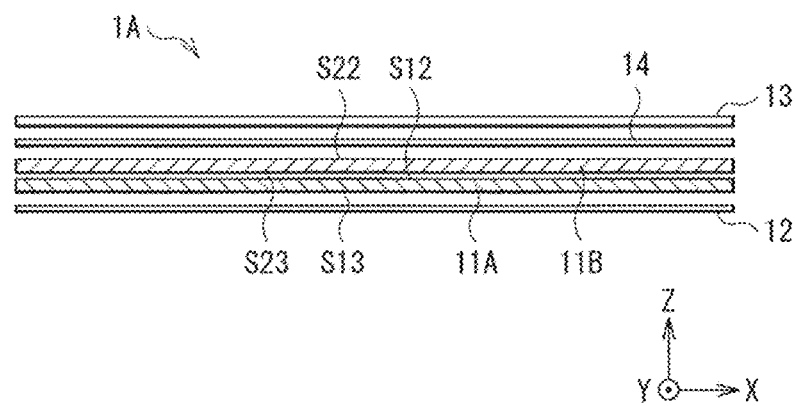

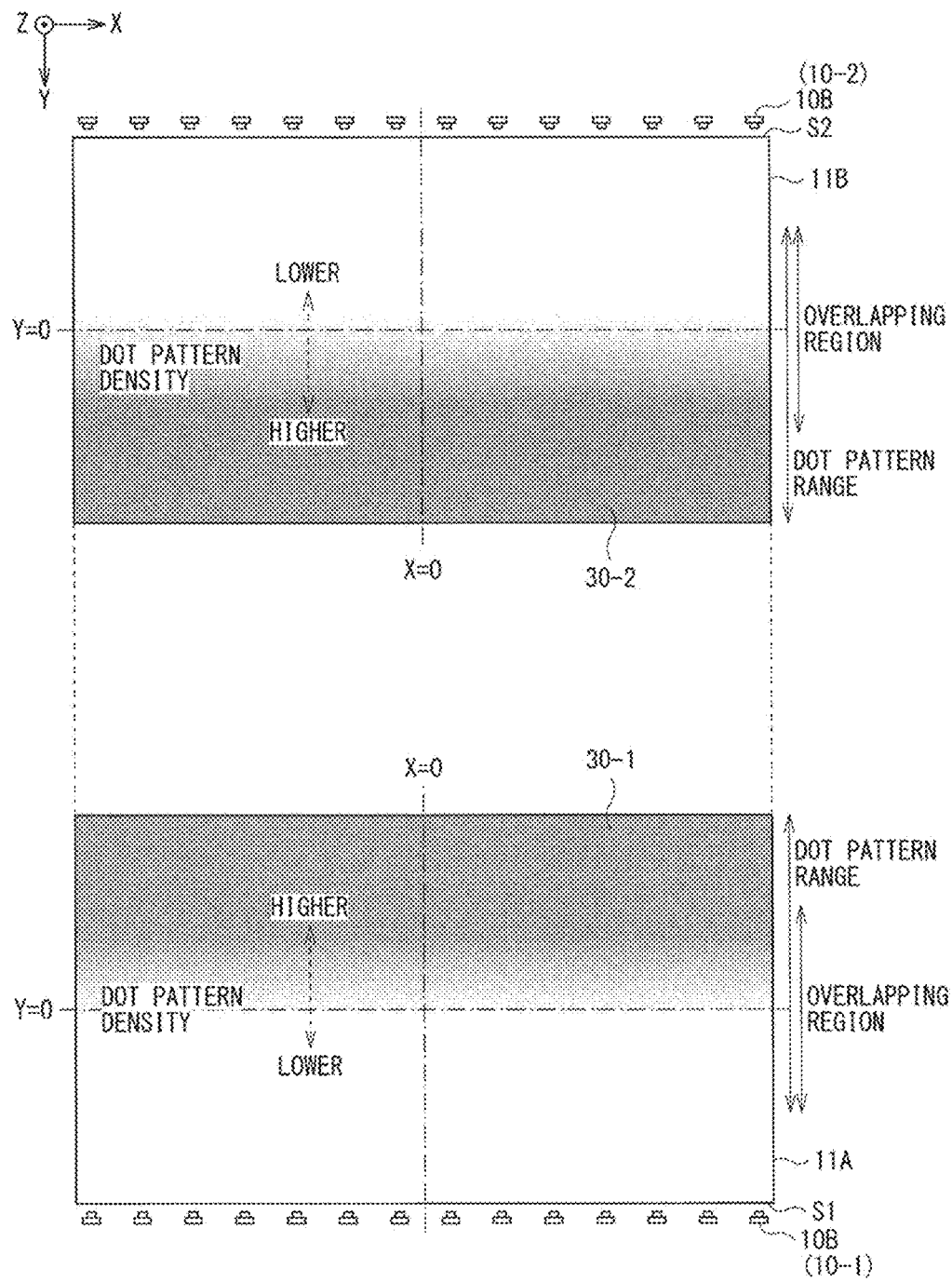
[FIG. 44]

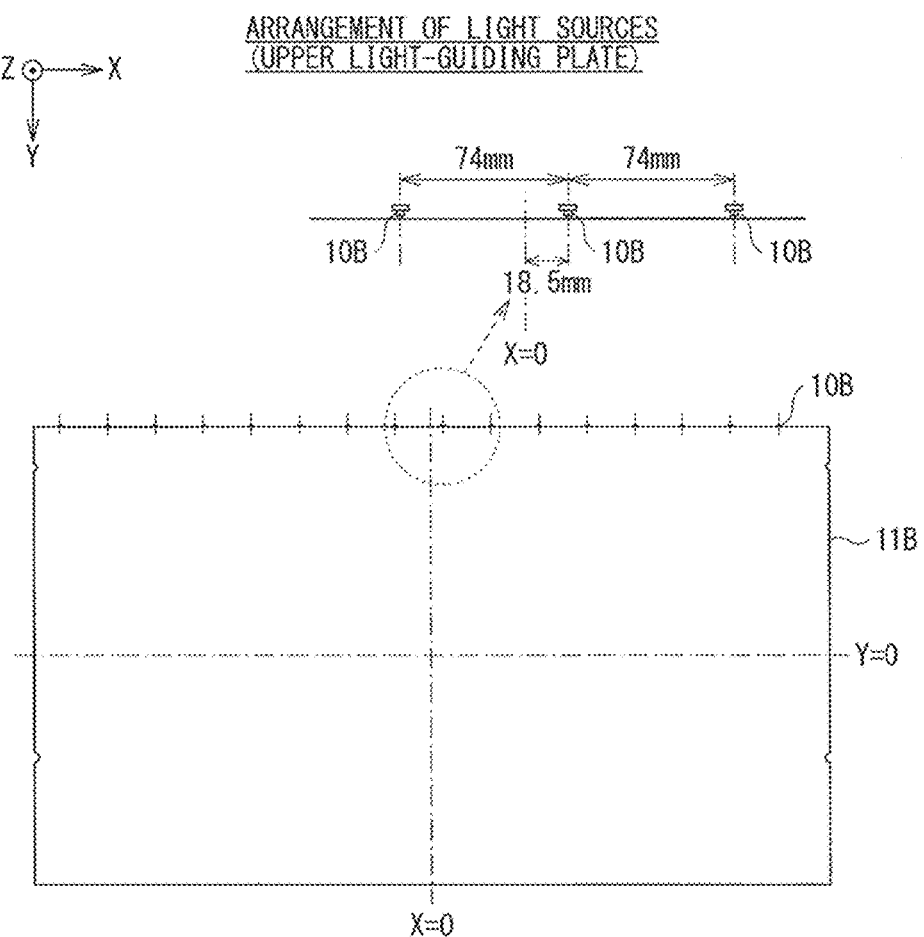
[FIG. 45]

[FIG. 46]
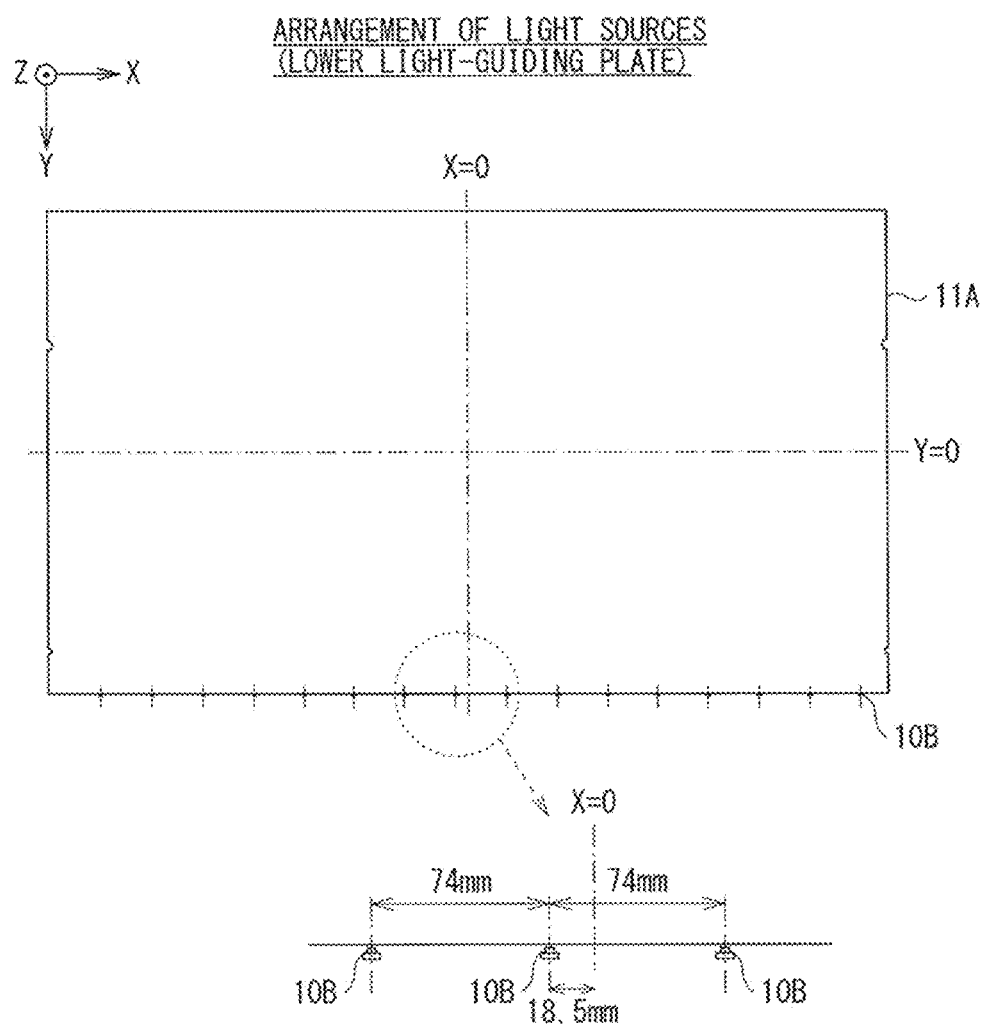

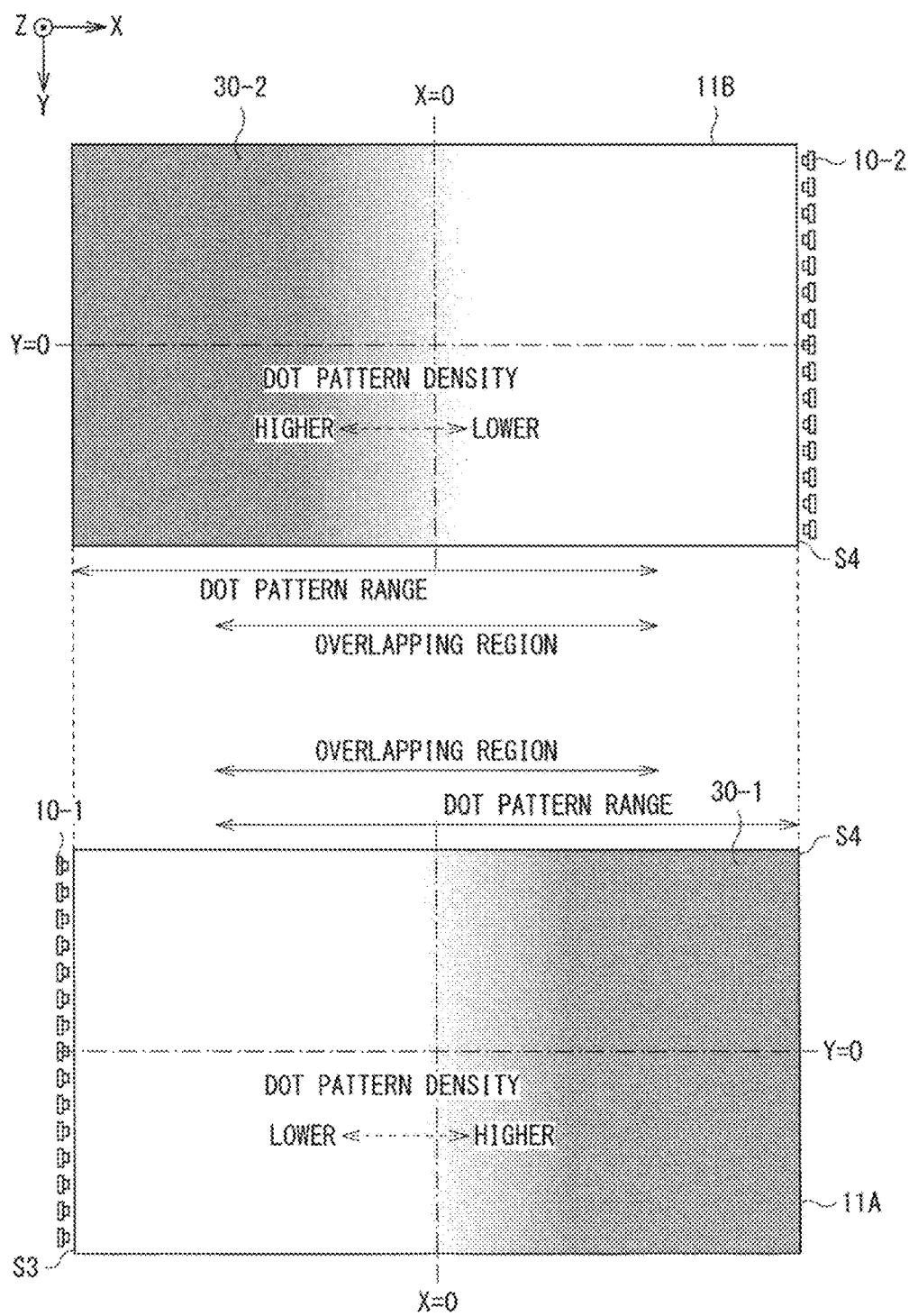
[FIG. 47]

[FIG. 48]
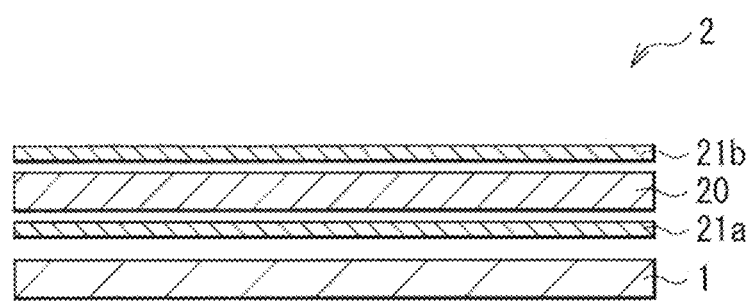
[FIG. 49]
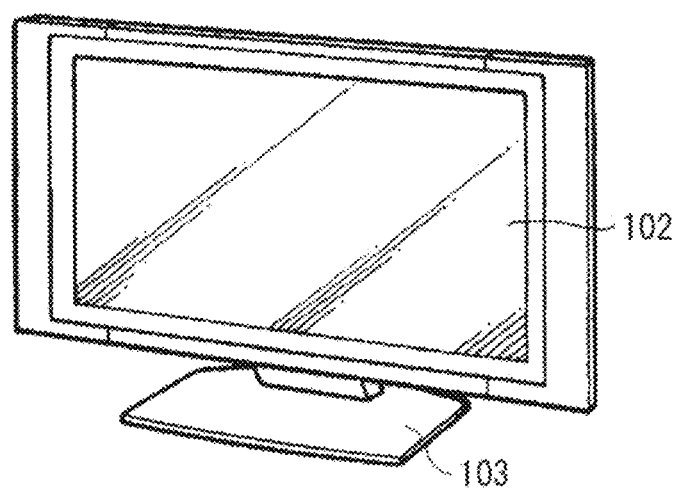

[ FIG. 50 ]
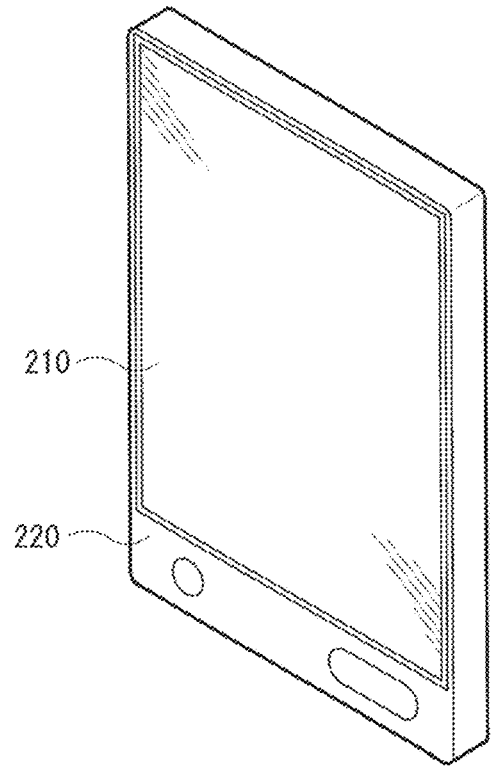
[ FIG. 51 ]
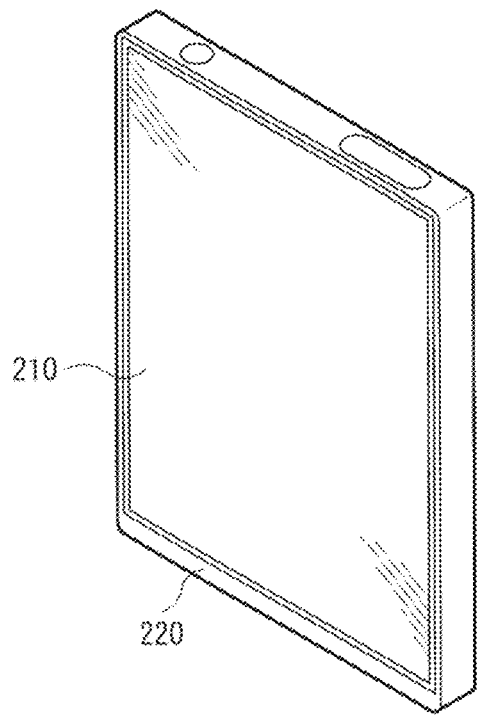

[ FIG. 52 ]
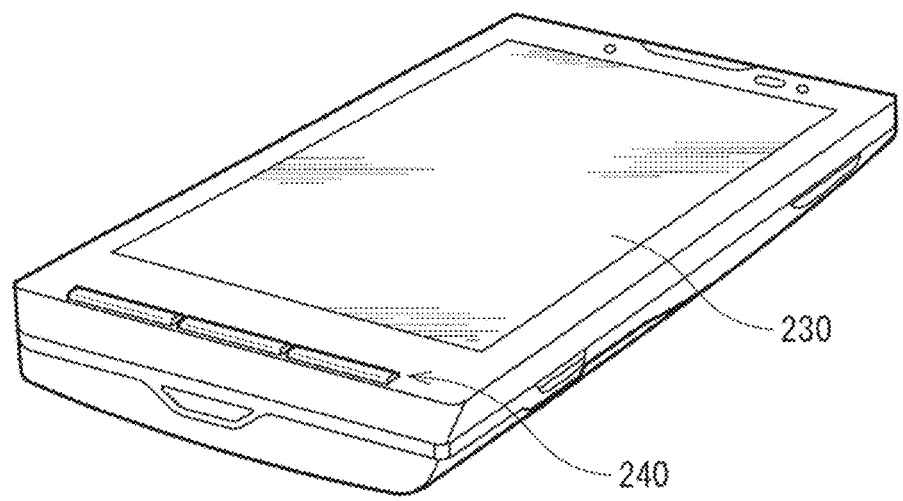
[ FIG. 53 ]
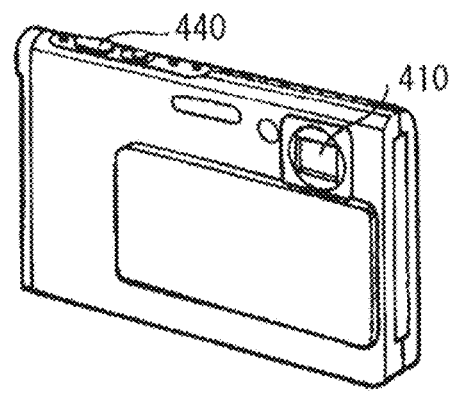
[ FIG. 54 ]
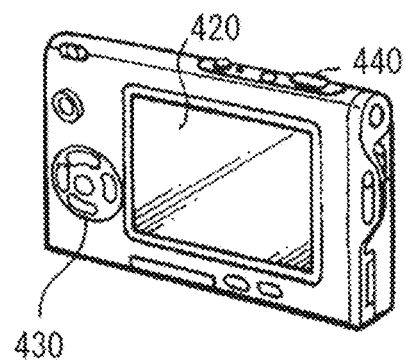

[ FIG. 55 ]
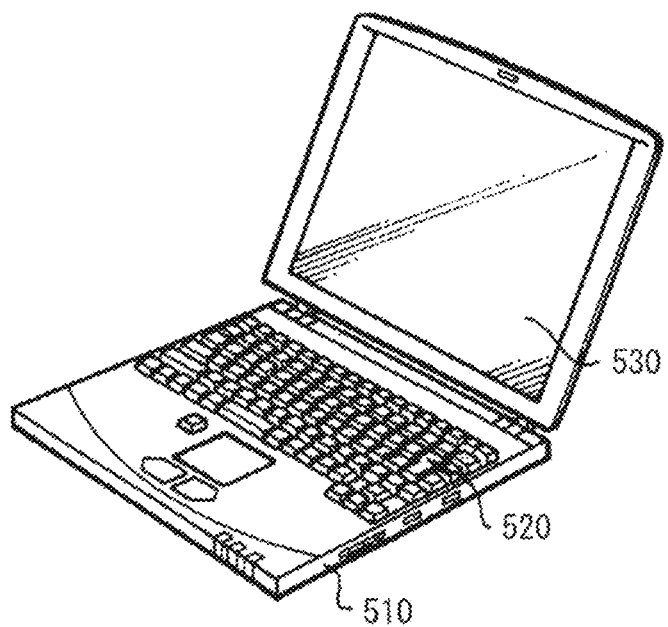
[ FIG. 56 ]
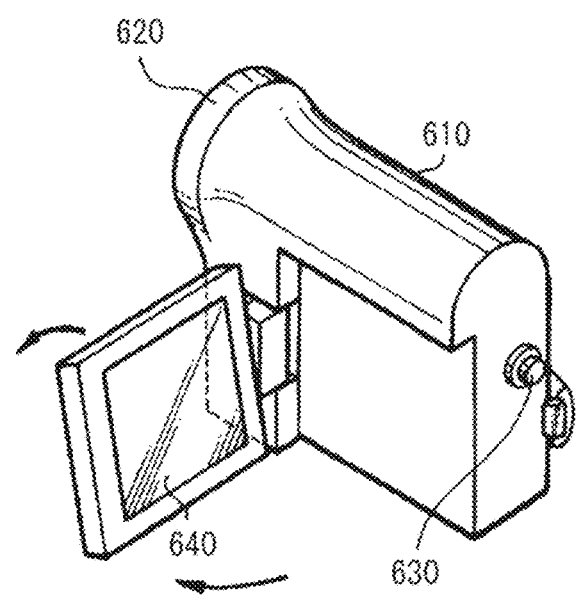

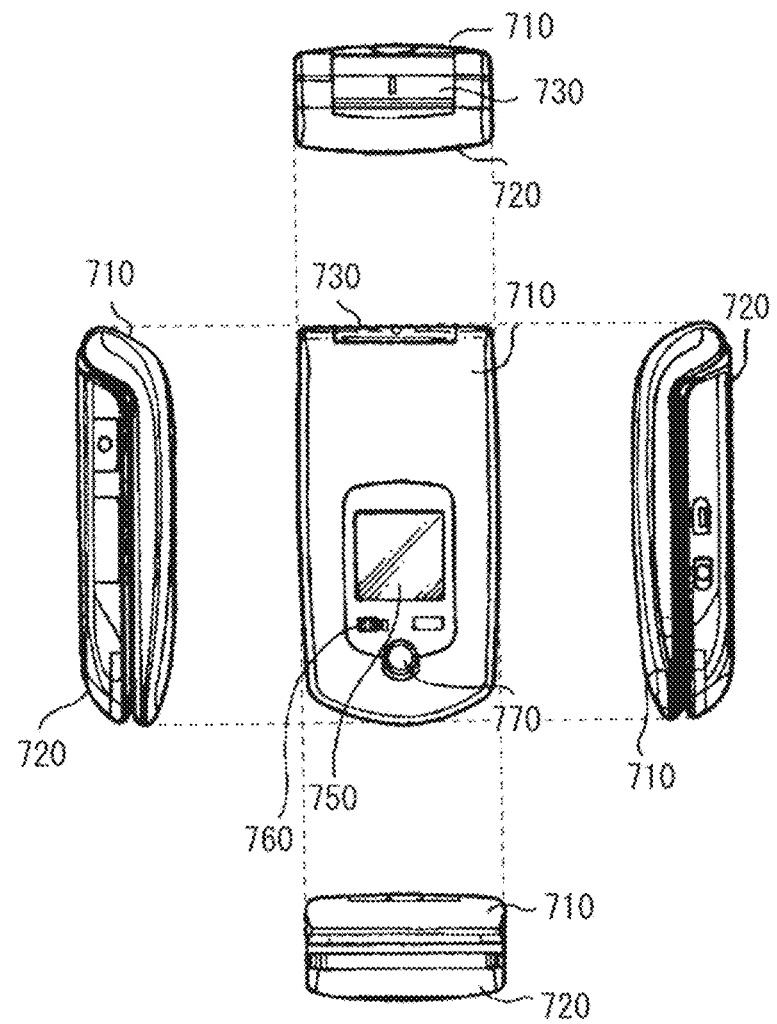
[ FIG. 57 ]

[ FIG. 58 ]
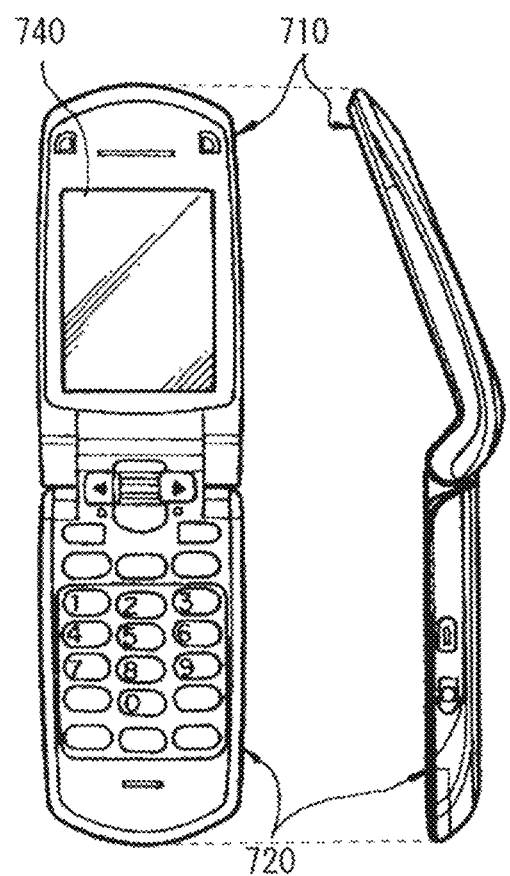

LIGHT-EMITTING DEVICE AND DISPLAY DEVICE

CROSS REFERENCE TO RELATED APPLICATIONS

This application is a U.S. National Phase of International Patent Application No. PCT/JP2015/052944 filed on Feb. 3, 2015, which claims priority benefit of Japanese Patent Application No. 2014-057460 filed in the Japan Patent Office on Mar. 20, 2014. Each of the above-referenced applications is hereby incorporated herein by reference in its entirety.

TECHNICAL FIELD

The present disclosure relates to a light-emitting device, and a display device equipped with it.

BACKGROUND ART

As a backlight for liquid crystal display devices and the like, light-emitting devices performing surface emission of light outgoing from a light source utilizing light-guiding plates are known. As such a light-emitting device, for example, as mentioned in PTL 1 and PTL 2, a structure is known that disposes a plurality of punctiform light sources such as LEDs (Light-Emitting Diodes) and laser diodes on side faces of light-guiding plates.

CITATION LIST

Patent Literature

[PTL 1] Japanese Unexamined Patent Application Publication (Published Japanese Translation of PCT Application) No. JP2003-532273 (FIG. 1A and FIG. 1B)
[PTL 2] Japanese Unexamined Patent Application Publication No. 2011-238484 (FIG. 1 and FIG. 2)

SUMMARY

In the light-emitting device as described above, it is desired to reduce luminance unevenness or color unevenness within light-emitting surfaces. Especially, when laser diodes are used as light sources, directivity may become intensive, and therefore it is more likely that luminance unevenness or color unevenness will occur.

In the light-emitting devices mentioned in PTL 1 and PTL 2, there has been proposed a structure that disposes two light-guiding plates to face each other where a plurality of punctiform light sources are arranged in side face directions different from each other, and combines light outgoing from those two light-guiding plates. In the light-emitting devices mentioned in such patent literature, each light-guiding plate is provided with a light emission enhancement section, for example a hemispherical convex shaped section that outputs, from a surface of the light-guiding plate, light from punctiform light sources that has entered from the side face direction. However, the light emission enhancement section provided on each light-guiding plate is provided at a region making up about a half of each light-guiding plate in the area, and the light emission enhancement section is provided in a pattern where such light emission enhancement sections do not substantially overlap when viewed from the surface of each light-guiding plate. As a result, reduction of luminance unevenness or color unevenness is insufficient.

Accordingly, it is desirable to provide a light-emitting device that makes it possible to reduce luminance unevenness or color unevenness, and a display device that includes such a light-emitting device.

A light-emitting device according to an embodiment of the present disclosure includes: a first light-guiding plate having a first light incidence surface, a first light emitting surface that emits light toward a predetermined light emission direction, and a first light emission enhancement surface provided with a first pattern; and a second light-guiding plate having a second light incidence surface, a second light emitting surface that emits light toward the light emission direction, and a second light emission enhancement surface provided with a second pattern, the second light-guiding plate facing the first light-guiding plate.

The first pattern is a pattern constituted by a plurality of first punctiform sections of which an arrangement pitch changes to cause density of the first punctiform sections to increase as a distance from the first light incidence surface increases, and the second pattern is a pattern constituted by a plurality of second punctiform sections of which an arrangement pitch changes to cause density of the second punctiform sections to increase as a distance from the second light incidence surface increases. When viewed from the light emission direction, regions provided with the first pattern and the second pattern partially overlap, and directions in which densities of the first pattern and the second pattern increase are opposite to each other.

A display device according to an embodiment of the present disclosure includes a display panel and a light-emitting device that illuminates the display panel, and includes with the light-emitting device according to the embodiment of the present disclosure as the light-emitting device.

In the light-emitting device or the display device according to the embodiment of the present disclosure, each of two light-guiding plates facing each other is provided with a pattern optimized to reduce luminance unevenness or color unevenness.

According to the light-emitting device or the display device according to the embodiment of the present disclosure, each of two light-guiding plates facing each other is provided with a pattern optimized to reduce luminance unevenness or color unevenness, and therefore it is possible to reduce the luminance unevenness or color unevenness.

It is to be noted that effects of the embodiments of the present disclosure are not limited thereto, and may include any of effects that will be described in the present disclosure.

BRIEF DESCRIPTION OF DRAWINGS

FIG. 1 is a perspective view of a configuration example of a light-emitting device according to a first embodiment of the present disclosure.
FIG. 2 is a cross-sectional view of a configuration example of the light-emitting device according to the first embodiment.
FIG. 3 is a plan view of a configuration example of light-guiding plates and light sources in the light-emitting device according to the first embodiment.
FIG. 4 is a plan view of an example of a dot pattern.
FIG. 5 is a plan view of a first example of arrangement of light sources.
FIG. 6 is a plan view of a second example of arrangement of light sources.

FIG. 7 is a characteristic diagram comparing coverage of dot patterns in a comparative example 1 and an example 1 of embodiment.

FIG. 8 is a plan view of dimensions of an upper light-guiding plate in the comparative examples 1 and 2, and the example 1 of embodiment.

FIG. 9 is a plan view of dimensions of a lower light-guiding plate in the comparative examples 1 and 2, and the example 1 of embodiment.

FIG. 10 is a characteristic diagram comparing luminance distributions in Y direction in the comparative example 1 and the example 1 of embodiment.

FIG. 11 is a plan view of an in-plane luminance distribution in the comparative example 1.

FIG. 12 is a plan view of an in-plane luminance distribution in the example 1 of embodiment.

FIG. 13 is a characteristic diagram comparing coverage of dot patterns in a comparative example 2 and the example 1 of embodiment.

FIG. 14 is a plan view of a dot pattern of the upper light-guiding plate in the comparative example 2.

FIG. 15 is a plan view of a dot pattern of the upper light-guiding plate in the example 1 of embodiment.

FIG. 16 is a characteristic diagram comparing luminance distributions in Y direction in the comparative example 2 and the example 1 of embodiment.

FIG. 17 is a plan view of an in-plane luminance distribution in the comparative example 2.

FIG. 18 is a characteristic diagram illustrating a luminance distribution in X direction in an example 2 of embodiment.

FIG. 19 is a plan view of an in-plane luminance distribution in the example 2 of embodiment.

FIG. 20 is a plan view of arrangement of light sources in an upper light-guiding plate according to the example 2 of embodiment.

FIG. 21 is a plan view of arrangement of light sources in a lower light-guiding plate according to the example 2 of embodiment.

FIG. 22 is a characteristic diagram illustrating a luminance distribution in X direction in an example 3 of embodiment.

FIG. 23 is a plan view of an in-plane luminance distribution in the example 3 of embodiment.

FIG. 24 is a plan view of arrangement of light sources in an upper light-guiding plate according to any of the examples 3, 4, and 5 of embodiment.

FIG. 25 is a plan view of arrangement of light sources in a lower light-guiding plate according to any of the examples 3, 4, and 5 of embodiment.

FIG. 26 is a characteristic diagram comparing coverage of dot patterns in the examples 3, 4, and 5 of embodiment.

FIG. 27 is a characteristic diagram comparing luminance distributions in Y direction in the examples 3, 4, and 5 of embodiment.

FIG. 28 is a characteristic diagram comparing normalized luminance distributions in Y direction in the examples 3, 4, and 5 of embodiment.

FIG. 29 is a characteristic diagram comparing the normalized luminance distribution in Y direction in the examples 3, 4, and 5 of embodiment.

FIG. 30 is a plan view of an in-plane luminance distribution in an example 4 of embodiment FIG. 31 is a characteristic diagram illustrating a luminance distribution in X direction in the example 4 of embodiment.

FIG. 32 is a plan view of an in-plane luminance distribution in an example 5 of embodiment.

FIG. 33 is a characteristic diagram illustrating a luminance distribution in X direction in the example 5 of embodiment.

FIG. 34 is a plan view of an in-plane luminance distribution of the upper light-guiding plate according to the example 3 of embodiment.

FIG. 35 is a characteristic diagram illustrating a luminance distribution in X direction of the upper light-guiding plate according to the example 3 of embodiment.

FIG. 36 is a plan view schematically illustrating a luminance distribution in the example 3 of embodiment.

FIG. 37 is a plan view of an in-plane luminance distribution of the upper light-guiding plate according to the example 4 of embodiment.

FIG. 38 is a characteristic diagram illustrating a luminance distribution in X direction of the upper light-guiding plate according to the example 4 of embodiment.

FIG. 39 is a plan view schematically illustrating a luminance distribution in the example 4 of embodiment.

FIG. 40 is a plan view of an in-plane luminance distribution of the upper light-guiding plate according to the example 5 of embodiment.

FIG. 41 is a characteristic diagram illustrating a luminance distribution in X direction of the upper light-guiding plate according to the example 5 of embodiment.

FIG. 42 is a plan view schematically illustrating a luminance distribution in the example 5 of embodiment.

FIG. 43 is a cross-sectional view of a configuration example of a light-emitting device according to a second embodiment.

FIG. 44 is a plan view of a configuration example of light-guiding plates and light sources in the light-emitting device according to the second embodiment.

FIG. 45 is a plan view of a specific example of arrangement of light sources attached to an upper light-guiding plate in the light-emitting device according to the second embodiment.

FIG. 46 is a plan view of a specific example of arrangement of light sources attached to a lower light-guiding plate in the light-emitting device according to the second embodiment.

FIG. 47 is a plan view of a configuration example of light-guiding plates and light sources in a light-emitting device according to a third embodiment.

FIG. 48 is a pattern view of a schematic configuration of a display device according to an application example.

FIG. 49 is a perspective view of an external appearance of a television.

FIG. 50 is a perspective view of an external appearance of an electronic book.

FIG. 51 is a perspective view of an external appearance of another electronic book.

FIG. 52 is a perspective view of an external appearance of a smartphone.

FIG. 53 is a perspective view of an external appearance viewed from the front side of a digital camera.

FIG. 54 is a perspective view of an external appearance viewed from the backside of the digital camera.

FIG. 55 is a perspective view of an external appearance of a notebook personal computer.

FIG. 56 is a perspective view of an external appearance of a video camera.

FIG. 57 is a front view, a left-side view, a right-side view, a top view, and a bottom view of an external appearance of a mobile phone in a closed state.

FIG. 58 is a front view and a side view of an external appearance of the mobile phone in an open state.

EMBODIMENTS

Hereinafter, some embodiments of the present disclosure will be described in detail with reference to the drawings. It is to be noted that description will be given in the following order.
<1. First Embodiment> (FIG. 1 to FIG. 42)
[1.1 Basic Configuration Example of Light-Emitting Device]
[1.2 Configuration Examples of Dot Patterns and Light Sources]
[1.3 Operation and Effects (Examples of Embodiment)]
<2. Second Embodiment> (Light-emitting device using only blue light sources) (FIG. 43 to FIG. 46)
<3. Third Embodiment> (Example where light sources are disposed on side face in X direction) (FIG. 47)
<4. Fourth Embodiment> (Examples of application to display device) (FIG. 48 to FIG. 58)
<5. Other Embodiments>

1. First Embodiment

1.1 Basic Configuration Example of Light-Emitting Device

FIG. 1 illustrates an overall configuration of a light-emitting device (backlight unit 1) according to a first embodiment of the present disclosure. FIG. 2 illustrates a cross-sectional configuration of the backlight unit 1. For example, the backlight unit 1 may illuminate a transmissive liquid crystal panel from behind, and has first light sources 10-1, second light sources 10-2, a lower light-guiding plate 11A, an upper light-guiding plate 11B, a reflective sheet 12, and an optical sheet 13.

It is to be noted that the "lower light-guiding plate 11A" corresponds to a specific example of a "first light-guiding plate" in one embodiment. Further, the "upper light-guiding plate 11B" corresponds to a specific example of a "second light-guiding plate" in one embodiment.

Each of the first light sources 10-1 and the second light sources 10-2 is a punctiform light source, and more specifically, includes a laser diode (semiconductor laser). As the laser diode, a laser diode that emits, for example, red-color, green-color, or blue-color light may be used. A plurality of first light sources 10-1 are so provided side by side as to face a light incidence surface (first light incidence surface) of the lower light-guiding plate 11A. A plurality of second light sources 10-2 are so provided side by side as to face a light incidence surface (second light incidence surface) of the upper light-guiding plate 11B. Alternatively, the first light sources 10-1 and the second light sources 10-2 may be LEDs (Light-Emitting Diodes), or laser diodes and light-emitting diodes may be mixed in the plurality of first light sources 10-1 and the plurality of second light sources 10-2.

Both the lower light-guiding plate 11A and the upper light-guiding plate 11B may be, for example, tabular (flat and rectangular parallelepiped) optical members. The lower light-guiding plate 11A has the first light incidence surface and a first light emitting surface, and is intended to guide light incoming from the first light incidence surface to the first light emitting surface. The upper light-guiding plate 11B has the second light incidence surface and a second light emitting surface, and is intended to guide light incoming from the second light incidence surface to the second light emitting surface. Further, the lower light-guiding plate 11A has a first light emission enhancement surface on which a first dot pattern 30-1 to be hereinafter described is provided. Similarly, the upper light-guiding plate 11B has a second light emission enhancement surface on which a second dot pattern 30-2 to be hereinafter described is provided.

Each of the lower light-guiding plate 11A and the upper light-guiding plate 11B may be configured to mainly contain a transparent thermoplastic resin material, such as polycarbonate resin (PC) or acrylic resin (for example, PMMA (polymethylmethacrylate)). The lower light-guiding plate 11A and the upper light-guiding plate 11B may face each other along Z direction, for example, in such a manner that superposed emitting light for each of the lower light-guiding plate 11A and the upper light-guiding plate 11B forms a light-emitting luminance distribution in the backlight unit 1. From the first light emitting surface and the second light emitting surface, light is emitted toward the Z direction as a predetermined light emission direction.

The reflective sheet 12 is a tabular or planar member that is configured to face the backside of the lower light-guiding plate 11A (a second main surface S13 facing the second light emitting surface), and is intended to return light leaking out of the lower light-guiding plate 11A (or the upper light-guiding plate 11B) toward the lower light-guiding plate 11A. The reflective sheet 12 has functions such as reflection, diffusion, and scattering, which makes it possible to efficiently utilize light from the first light sources 10-1 and the second light sources 10-2, thereby enhancing the frontal luminance.

This reflective sheet 12 may be constituted by, for example, expanded PET (polyethylene terephthalate), silver-evaporated film, multi-layer reflective film, or white PET. When the reflective sheet 12 is provided with a capability of regular reflection (specular reflection), it may be preferable that the surface of the reflective sheet 12 be subjected to a treatment such as silver evaporation, aluminum evaporation, or multi-layer film reflection. When the reflective sheet 12 is given a microscopic geometry, the reflective sheet 12 may be formed in an integrated manner by use of a method such as thermal press molding utilizing thermoplastic resin or melt extrusion molding, or may be formed in such a manner that a base material made of, for example, PET is coated with energy ray (for example, ultraviolet) curable resin, and thereafter a shape is transferred onto the energy ray curable resin. Here, examples of the thermoplastic resin may include polycarbonate resin, acrylic resin such as PMMA (polymethylmethacrylate), polyester resin such as polyethylene terephthalate, amorphous copolymer polyester resin such as MS (copolymer of methyl methacrylate and styrene), polystyrene resin, and polyvinyl chloride resin. Further, when a shape is transferred onto the energy ray (for example, ultraviolet) curable resin, a base material may be made of glass.

The optical sheet 13 is configured to face the first light emitting surface of the upper light-guiding plate 11B, and may include, for example, a diffusion plate, a diffusion sheet, a lens film, and a polarization separation sheet. By providing such an optical sheet 13, it is possible to make light outgoing in an oblique direction from the upper light-guiding plate 11B rise toward a front direction, which allows the frontal luminance to be further enhanced.

1.2 Configuration Examples of Dot Patterns and Light Sources

Further, configuration examples of dot patterns and light sources will be described more specifically with reference to FIG. 3 to FIG. 6.

FIG. 3 illustrates an arrangement configuration of the lower light-guiding plate 11A, the upper light-guiding plate 11B, the first light sources 10-1, and the second light sources 10-2 in X-Y plane. As illustrated in FIG. 2, the lower light-guiding plate 11A has a first main surface S12 and a second main surface S13. Similarly, as illustrated in FIG. 2, the upper light-guiding plate 11B has a first main surface S22 and a second main surface S23.

In the lower light-guiding plate 11A, one side face (a first side face 51) is the first light incidence surface, while one main surface S12 (a surface facing the upper light-guiding plate 11B) is the first light emitting surface. Further, another main surface S13 is a first light emission enhancement surface on which a first dot pattern 30-1 is provided.

In the upper light-guiding plate 11B, one side face (a second side face S2) constitutes the second light incidence surface, while one main surface S22 (a surface facing the optical sheet 13) constitutes the second light emitting surface. In this example, the light emitting surface of the upper light-guiding plate 11B configures a light output surface of an entire light-guiding section. Further, another main surface S23 is a second light emission enhancement surface on which a second dot pattern 30-2 is provided.

The lower light-guiding plate 11A and the upper light-guiding plate 11B are stacked in such a manner that the first light incidence surface and the second light incidence surface are not superposed on each other in Z direction. Specifically, the first light incidence surface of the lower light-guiding plate 11A is provided on either one (for example, the first side face 51) of two side face corresponding to long sides of an X-Y planar shape (for example, a rectangular shape), and the second light incidence surface of the upper light-guiding plate 11B is provided on the other surface (for example, the second side face S2) of two side face corresponding to long sides of the rectangular shape. The plurality of first light sources 10-1 are arranged to face the first light incidence surface of the lower light-guiding plate 11A along one direction. Further, the plurality of second light sources 10-2 are arranged to face the second light incidence surface of the upper light-guiding plate 11B along one direction. With such a configuration, when viewed from a light emission direction (Z direction), light is emitted toward directions opposite to each other from the first light sources 10-1 and the second light sources 10-2, and light moving toward directions opposite to each other enters on the lower light-guiding plate 11A and the upper light-guiding plate 11B.

The first dot pattern 30-1 is provided to cover a region making up more than half of the first light emission enhancement surface of the lower light-guiding plate 11A. The second dot pattern 30-2 is provided to cover a region making up more than half of the second light emission enhancement surface of the upper light-guiding plate 11B. As illustrated in FIG. 3, this ensures to have an overlapping region in which regions provided with the first dot pattern 30-1 and the second dot pattern 30-2 partially overlap when viewed from a light emission direction.

FIG. 4 schematically illustrates the second dot pattern 30-2 of the upper light-guiding plate 11B, and the first dot pattern 30-1 of the lower light-guiding plate 11A also has a substantially similar configuration with the exception that a direction where a pattern density becomes higher is opposite. The lower light-guiding plate 11A has the first dot pattern 30-1 configured in such a manner that microscopic dots 31 are provided as first punctiform sections on the first light emission enhancement surface. The upper light-guiding plate 11B also has a substantially similar configuration, and has the second dot pattern 30-2 configured in such a manner that the dots 31 are provided as second punctiform sections on the second light emission enhancement surface. Each of the first dot pattern 30-1 and the second dot pattern 30-2 is formed of a white dot pattern that is silkscreen-printed using a white ink, for example. Alternatively, as the first dot pattern 30-1 and the second dot pattern 30-2, a pattern having convex or concave portions corresponding to the dots 31 may be formed using laser machining, for example.

The lower light-guiding plate 11A is configured in such a manner that the density of the dots 31 in the first dot pattern 30-1 changes depending on distance from the light incidence surface. Similarly, the upper light-guiding plate 11B is also configured in such a manner that the density of the dots 31 in the second dot pattern 30-2 changes depending on distance from the light incidence surface. More specifically, in the lower light-guiding plate 11A, the density of the dots 31 becomes higher with increasing distance from the light incidence surface (the density of the dots 31 becomes lower with decreasing distance from the light incidence surface). Also in the upper light-guiding plate 11B, the density of the dots 31 becomes higher with increasing distance from the light incidence surface (the density of the dots 31 becomes lower with decreasing distance from the light incidence surface). As a result, as illustrated in FIG. 3, when viewed from a light emission direction, directions where the density of the dots 31 becomes higher in the first dot pattern 30-1 and the second dot pattern 30-2 are opposite to each other. It is to be noted that the dot density is allowed to be changed in a step-by-step manner by changing, for example, but not limited to, the number, pitch, and size of the dots 31 for each region.

It is preferable that the density of each of the first dot pattern 30-1 and the second dot pattern 30-2 be changed by changing both the arrangement pitch (dot pitch) and the size (dot size) of the dots 31. For example, as illustrated in FIG. 4, it is preferable to make a dot size Ds1 in a portion with the relatively lower density smaller than a dot size Ds2 in a portion with the relatively higher density. Further, it is preferable to make a dot pitch Xp2 in X direction and a dot pitch Yp2 in Y direction in a portion with the relatively higher density smaller than a dot pitch Xp1 in X direction and a dot pitch Yp1 in Y direction in a portion with the relatively lower density.

FIG. 5 illustrates a first example of arrangement of the light sources 10. Each of the first light sources 10-1 and the second light sources 10-2 may include a red light source 10R that emits red-color light, a green light source 10G that emits blue-color light, and a blue light source 10B that emits green-color light. White-color light may be generated by color mixture of such color light. Further, each of the first light sources 10-1 and the second light sources 10-2 may configure a single light source unit 10U using a predetermined number of color light sources. In an example in FIG. 5, three red light sources 10R, one green light source 10G and one blue light source 10B configure the single light source unit 10U. Moreover, in the example in FIG. 5, when viewed from a light emission direction, optical axis positions of the respective first light sources 10-1 are the same as optical axis positions of the respective second light sources 10-2. More specifically, the optical axis positions of respective light sources in X direction in the lower light-guiding plate 11A are the same as the optical axis positions of respective light sources in X direction in the upper light-guiding plate 11B.

FIG. 6 illustrates a second example of arrangement of the light sources 10. Between the lower light-guiding plate 11A and the upper light-guiding plate 11B, relative positions of the first light sources 10-1 and the second light sources 10-2 may be offset in such a manner that the optical axis positions of the first light sources 10-1 and the second light sources 10-2 in X direction are different from each other. In the example in FIG. 6, when viewed from a light emission direction, the optical axis positions of the first light sources 10-1 in one of the light source units 10U and the second light sources 10-2 in a corresponding light source unit 10U are different from each other.

1.2 Operation and Effects

Examples of Embodiment

In this backlight unit 1, the light that has been emitted from the first light sources 10-1 and has entered the light incidence surface of the lower light-guiding plate 11A proceeds through the lower light-guiding plate 11A to exit from the first light emitting surface. Meanwhile, the light that has been emitted from the second light sources 10-2 and has entered the second light incidence surface of the upper light-guiding plate 11B proceeds through the upper light-guiding plate 11B to exit from the second light emitting surface. The light outgoing from each of the lower light-guiding plate 11A and the light from upper light-guiding plate 11B are combined, and the resulting light passes through the optical sheet 13 to be observed as emitted light.

Here, according to the present embodiment, a dot pattern optimized to reduce luminance unevenness or color unevenness is provided on each of two light-guiding plates that face each other, and thus it is possible to reduce the luminance unevenness or color unevenness. Further, by optimizing the arrangement of respective light sources that face the light incidence surfaces of respective light-guiding plates, it is possible to further reduce the luminance unevenness or color unevenness.

Hereinafter, the description will be provided on the operation and effects of the light-emitting device according to the present embodiment by taking specific comparative examples and examples of embodiment.

It is to be noted that the effects described in the present specification are provided only for illustrative purposes and are not limited thereto. Therefore, any other effects may be available. This is also true of other subsequent embodiments.

In the comparative examples and examples of embodiment to be hereinafter described, as with configuration examples in FIG. 5 and FIG. 6, the description will be provided on a case as an example where three red light sources 10R, one green light source 10G and one blue light source 10B configure a single light source unit 10U in the first light sources 10-1 and the second light sources 10-2.

(1) Effects of Providing Overlapping Regions of Dot Patterns 30-1 and 30-2 on Lower- and Upper Light-Guiding Plates 11A and 11B FIG. 7 compares coverage of dot patterns in a comparative example 1 and an example 1 of embodiment. FIG. 7 illustrates coverage of the second dot pattern 30-2 in the upper light-guiding plate 11B; however, coverage of the first dot pattern 30-1 in the lower light-guiding plate 11A may be also substantially similar to the above coverage. In FIG. 7, a vertical scale denotes coverage of the second dot pattern 30-2, and a horizontal scale denotes a distance in Y direction. The distance in Y direction defines a center of Y direction as 0, and a light incidence surface side (a side on which the light sources are disposed) as a minus direction. This is applicable to other subsequent characteristic diagrams. For example, in the case of the upper light-guiding plate 11B, the second light incidence surface side (a side on which the second light sources 10-2 are disposed) is defined as a minus direction. In the case of the lower light-guiding plate 11A, the first light incidence surface side (a side on which the first light sources 10-1 are disposed) is defined as a minus direction.

As seen from FIG. 7, the dot patterns 30-1 and 30-2 are provided only from the center of Y direction toward a plus direction in the comparative example 1. In the comparative example 1, the first dot pattern 30-1 is provided to cover a region making up more than half of the first light emission enhancement surface of the lower light-guiding plate 11A, and the second dot pattern 30-2 is provided to cover a region making up more than half of the second light emission enhancement surface of the upper light-guiding plate 11B. In other words, the comparative example 1 illustrates a configuration where overlapping regions of the dot patterns 30-1 and 30-2 (see FIG. 3) are not provided. Meanwhile, in the example 1 of embodiment, as seen from FIG. 7, the dot patterns 30-1 and 30-2 are also provided at a minus side of Y direction, and overlapping regions of the dot patterns 30-1 and 30-2 (see FIG. 3) are provided.

FIG. 8 illustrates dimensions of each section of the upper light-guiding plate 11B in the comparative example 1 and the example 1 of embodiment. FIG. 9 illustrates dimensions of each section of the lower light-guiding plate 11A in the comparative example 1 and the example 1 of embodiment. FIG. 9 also illustrates dimensions in arrangement of the first light sources 10-1; however, dimensions in arrangement of the second light sources 10-2 are also basically similar to the above dimensions. In the comparative example 1 and the example 1 of embodiment, optical axis positions of the first light sources 10-1 and the second light sources 10-2 in X direction are the same to each other. It is to be noted that also in a comparative example 2 to be hereinafter described, the dimensions are similar to those illustrated in FIG. 8 and FIG. 9.

FIG. 10 compares luminance distributions in Y direction in the comparative example 1 and the example 1 of embodiment. FIG. 11 illustrates an in-plane luminance distribution in the comparative example 1. FIG. 12 illustrates an in-plane luminance distribution in the example 1 of embodiment. In FIG. 10, a vertical scale denotes luminance, and a horizontal scale denotes a distance in Y direction. FIG. 10 illustrates characteristics in a case where both the lower light-guiding plate 11A and the upper light-guiding plate 11B are illuminated and characteristics in a case where only the upper light-guiding plate 11B is illuminated. As seen from these luminance distributions, in the comparative example 1, since overlapping regions of the dot patterns 30-1 and 30-2 are not provided, the luminance deteriorates in the vicinity of the center of Y direction (Y=0), resulting in such an area being darkened. In contrast, in the example 1 of embodiment, since overlapping regions of the dot patterns 30-1 and 30-2 are provided, deterioration of luminance is reduced.

(2) Effects of Configuring Dot Patterns 30-1 and 30-2 as Patterns with Variable Dot Pitches FIG. 13 compares coverage of dot patterns in the comparative example 2 and the example 1 of embodiment. FIG. 13 illustrates coverage of the second dot pattern 30-2 in the upper light-guiding plate 11B; however, coverage of the first dot pattern 30-1 in the lower light-guiding plate 11A may be also substantially similar to the above coverage. In FIG. 13, a vertical scale denotes coverage of the second dot pattern 30-2, and a horizontal scale denotes a distance in Y direction.

FIG. 14 illustrates a configuration of the second dot pattern 30-2 of the upper light-guiding plate 11B in the comparative example 2; however, a configuration of the first dot pattern 30-1 of the lower light-guiding plate 11A may be also substantially similar to the above configuration. FIG. 15 illustrates a configuration of the second dot pattern 30-2 of the upper light-guiding plate 11B in the example 1 of embodiment; however, a configuration of the first dot pattern 30-1 of the lower light-guiding plate 11A may be also substantially similar to the above configuration. It is to be noted that FIG. 15 illustrates, for reference, a boundary 40 of a valid region available as illuminating light.

As illustrated in FIG. 15, in the example 1 of embodiment, the pattern density in the second dot pattern 30-2 of the upper light-guiding plate 11B (and the first dot pattern 30-1 of the lower light-guiding plate 11A) is changed by changing a dot pitch (and a dot size) of the dots 31 according to position in Y direction. In contrast, in the comparative example 1, as illustrated in FIG. 14, the pattern density is changed only by changing a dot size without changing a dot pitch.

FIG. 16 compares luminance distributions in Y direction in the comparative example 2 and the example 1 of embodiment. FIG. 17 illustrates the in-plane luminance distribution in the comparative example 2. In FIG. 16, a vertical scale denotes luminance, and a horizontal scale denotes a distance in Y direction. FIG. 16 illustrates characteristics in a case where both the lower light-guiding plate 11A and the upper light-guiding plate 11B are illuminated and characteristics in a case where only the upper light-guiding plate 11B is illuminated.

There is a limitation in minimizing the dot size from the manufacturing perspective, and thus if an attempt is made to form the dot pattern with identical dot pitches as found in the comparative example 2, it may be difficult to gradually reduce the minimum coverage to zero as illustrated in FIG. 13. As a result, in the comparative example 2, a singularity of change in coverage occurs in a starting point of the dot pattern, and such singularity is recognized as luminance unevenness as indicated in positions Ya, Yb, and Yc in FIG. 16 and FIG. 17. On the contrary, in the example 1 of embodiment, it is possible to achieve surface light sources that avoid occurrence of singularity unevenness by changing the dot pitches.

(3) Effects of Making (Offsetting) Optical Axis Positions of First Light Sources 10-1 and Second Light Sources 10-2 in X Direction Different from Each Other FIG. 18 illustrates a luminance distribution in X direction in the example 2 of embodiment. In FIG. 18, a vertical scale denotes luminance, and a horizontal scale denotes a distance in X direction. The distance in X direction defines a center of X direction as 0, and a left side when viewed from the light exit side as a minus direction. This is applicable to other subsequent characteristic diagrams. FIG. 19 illustrates an in-plane luminance distribution in the example 2 of embodiment. FIG. 20 illustrates dimensions in arrangement of the second light sources 10-2 in the upper light-guiding plate 11B according to the example 2 of embodiment. FIG. 21 illustrates dimensions in arrangement of the first light sources 10-1 in the lower light-guiding plate 11A according to the example 2 of embodiment.

FIG. 22 illustrates a luminance distribution in X direction in an example 3 of embodiment. In FIG. 22, a vertical scale denotes luminance, and a horizontal scale denotes a distance in X direction. FIG. 23 illustrates an in-plane luminance distribution in the example 3 of embodiment. FIG. 24 illustrates dimensions in arrangement of the second light sources 10-2 in the upper light-guiding plate 11B according to the example 3 of embodiment. FIG. 25 illustrates dimensions in arrangement of the first light sources 10-1 in the lower light-guiding plate 11A according to the example 3 of embodiment. It is to be noted that also in examples 4 and 5 of embodiment to be hereinafter described, dimensions are similar to those illustrated in FIG. 24 and FIG. 25.

In the example 2 of embodiment, as illustrated in FIG. 20 and FIG. 21, as in the case of a configuration example illustrated in FIG. 5, the optical axis positions of the first light sources 10-1 and the second light sources 10-2 in X direction are the same to each other (no offset). In the example 3 of embodiment, as illustrated in FIG. 24 and FIG. 25, as in the case of a configuration example illustrated in FIG. 6, the optical axis positions of the first light sources 10-1 and the second light sources 10-2 in X direction are made different (offset) from each other. When the arrangement pitch in the first light sources 10-1 and the second light sources 10-2 is enlarged, if the first light sources 10-1 and the second light sources 10-2 are disposed on the same axis, the luminance at a region on that axis line increases, resulting in occurrence of luminance unevenness in X direction as illustrated in FIG. 18 and FIG. 19. By offsetting the first light sources 10-1 and the second light sources 10-2 by about ½ pitch as illustrated in FIG. 24 and FIG. 25, the luminance unevenness in X direction is significantly reduced as illustrated in FIG. 22 and FIG. 23.

(4) Effects of Ensuring that Light Emission Luminance Each of Lower Light-Guiding Plate 11A and Upper Light-Guiding Plate 11B Satisfies Given Relational Expressions FIG. 26 compares coverage of dot patterns in the examples 3, 4, and 5 of embodiment. FIG. 26 illustrates coverage of the second dot pattern 30-2 in the upper light-guiding plate 11B; however, coverage of the first dot pattern 30-1 in the lower light-guiding plate 11A may be also substantially similar to the above coverage. In FIG. 26, a vertical scale denotes coverage of the second dot pattern 30-2, and a horizontal scale denotes a distance in Y direction.

FIG. 27 compares luminance distributions in Y direction in the examples 3, 4, and 5 of embodiment. In FIG. 27, a vertical scale denotes luminance, and a horizontal scale denotes a distance in Y direction. FIG. 27 illustrates characteristics in a case where both the lower light-guiding plate 11A and the upper light-guiding plate 11B are illuminated and characteristics in a case where only the upper light-guiding plate 11B is illuminated.

Each of FIG. 28 and FIG. 29 compares normalized luminance distributions in Y direction in the examples 3, 4, and 5 of embodiment. In FIG. 28 and FIG. 29, a vertical scale denotes normalized luminance, and a horizontal scale denotes a normalized distance in Y direction. FIG. 28 and FIG. 29 illustrate characteristics in a case where both the lower light-guiding plate 11A and the upper light-guiding plate 11B are illuminated and characteristics in a case where only the upper light-guiding plate 11B is illuminated.

FIG. 30 illustrates an in-plane luminance distribution in the example 4 of embodiment. FIG. 31 illustrates a luminance distribution in X direction in the example 4 of embodiment. In FIG. 31, a vertical scale denotes luminance, and a horizontal scale denotes a distance in X direction. FIG. 32 illustrates an in-plane luminance distribution in the example 5 of embodiment. FIG. 33 illustrates a luminance distribution in X direction in the example 5 of embodiment.

In FIG. 33, a vertical scale denotes luminance, and a horizontal scale denotes a distance in X direction.

FIG. 34 illustrates an in-plane luminance distribution of an upper light-guiding plate according to the example 3 of embodiment. FIG. 35 illustrates a luminance distribution in X direction of the upper light-guiding plate according to the example 3 of embodiment. In FIG. 35, a vertical scale denotes luminance, and a horizontal scale denotes a distance in X direction. FIG. 36 schematically illustrates a luminance distribution in the example 3 of embodiment. FIG. 36 schematically illustrates the luminance distribution in a case where the light emission luminance of the lower light-guiding plate 11A and the light emission luminance of the upper light-guiding plate 11B are combined in the example 3 of embodiment.

FIG. 37 illustrates an in-plane luminance distribution of an upper light-guiding plate according to the example 4 of embodiment. FIG. 38 illustrates a luminance distribution in X direction of the upper light-guiding plate according to the example 4 of embodiment. In FIG. 38, a vertical scale denotes luminance, and a horizontal scale denotes a distance in X direction. FIG. 39 schematically illustrates the luminance distribution in the example 4 of embodiment. FIG. 39 schematically illustrates the luminance distribution in a case where the light emission luminance of the lower light-guiding plate 11A and the light emission luminance of the upper light-guiding plate 11B are combined in the example 4 of embodiment.

FIG. 40 illustrates an in-plane luminance distribution of an upper light-guiding plate according to the example 5 of embodiment. FIG. 41 illustrates a luminance distribution in X direction of the upper light-guiding plate according to the example 5 of embodiment. In FIG. 41, a vertical scale denotes luminance, and a horizontal scale denotes a distance in X direction. FIG. 42 schematically illustrates a luminance distribution in the example 5 of embodiment. FIG. 42 schematically illustrates the luminance distribution in a case where the light emission luminance of the lower light-guiding plate 11A and the light emission luminance of the upper light-guiding plate 11B are combined in the example 4 of embodiment.

In each of the examples 3, 4, and 5 of embodiment, as illustrated in FIG. 26, as a pattern, coverage of the dot patterns changes depending on distance in Y direction. In this case, the luminance distribution in Y direction when either the upper light-guiding plate 11B or the lower light-guiding plate 11A is only illuminated may be different in each of the examples of embodiment as illustrated in FIG. 27. Even in such a case, the luminance distribution in Y direction when both the upper light-guiding plate 11B and the lower light-guiding plate 11A are illuminated is allowed to be made substantially similar in each of the examples of embodiment as illustrated in FIG. 27.

However, as illustrated in FIG. 30 to FIG. 42, the luminance distribution in X direction differs in each of the examples of embodiment, and the luminance distribution when viewed from the plane as a whole may be different. Further, when the luminance distribution is considered as superposition of the emission luminance distributions of the lower light-guiding plate 11A and the upper light-guiding plate 11B, there may exist an optimal distribution in relation to change in luminance in Y direction. For the luminance distribution with steep change in luminance in Y direction like the example 4 of embodiment illustrated in FIG. 27, there are regions where the luminance distributions do not match in the upper- and lower-light-guiding plates as illustrated in FIG. 39. Moreover, for the luminance distribution with excessively gentle change in luminance in Y direction like the example 5 of embodiment illustrated in FIG. 27, there is a tendency to increase the luminance at the light source side as illustrated in FIG. 42. Therefore, it is preferable to achieve intermediate change in luminance in Y direction.

Here, as illustrated in FIG. 28, the luminance at an arbitrary position within a viewing plane orthogonal to a light emission direction may preferably satisfy the conditions given below:
when $y<0$, $$0.025+1.05 \cdot \sin^2\{(y+1) \cdot \pi/4\} > L > (0.45+1.6 \cdot y) \quad (1)$$

when $y \geq 0$, $$-0.075+1.05 \cdot \sin^2\{(y+1) \cdot \pi/4\} < L < (0.55+1.6 \cdot y) \quad (2)$$

L max=1, and L min=0
where
y is a position in a light-guiding direction in each light-guiding plate when viewed from a light emission direction (in the light-guiding direction of each light-guiding plate, a position of each light incidence surface is −1, a center is 0, and a position of a side face facing each light incidence surface is 1),
L is a luminance ratio (a luminance ratio at the arbitrary position when either the first light sources 10-1 or the second light sources 10-2 are only turned on, when the luminance at the arbitrary position within a viewing plane when both the first and second light sources 10-1 and 10-2 are turned on is 1),
L max is a maximum value of L, and
L min is a minimum value of L.

More preferably, as illustrated in FIG. 28, the above-described luminance may satisfy the conditions (1)' and (2)' given below:
when $y<0$, $$0.025+0.95 \cdot \sin^2\{(y+1) \cdot \pi/4\} \geq L \geq (0.5+1.8 \cdot y) \quad (1)'$$

when $y \geq 0$, $$0.025+0.95 \cdot \sin^2\{(y+1) \cdot \pi/4\} \leq L \leq (0.5+1.8 \cdot y) \quad (2)',$$

L max=1, and L min=0

2. Second Embodiment

Light-Emitting Device Using Only Blue Light Sources

Next, the description is provided on a light-emitting device (backlight unit 1A) according to a second embodiment of the present disclosure. Hereinafter, it is to be noted that any component parts essentially same as those in the backlight unit 1 according to the above-described first embodiment are denoted with the same reference numerals, and the related descriptions are omitted as appropriate.

FIG. 43 illustrates an example of a cross-sectional configuration of the backlight unit 1A according to the present embodiment. FIG. 44 illustrates an arrangement configuration in X-Y plane for the lower light-guiding plate 11A, the upper light-guiding plate 11B, the first light sources 10-1, and the second light sources 10-2 in the second embodiment. The backlight unit 1A according to the present embodiment is also provided with a wavelength conversion sheet 14. In the above-described first embodiment, as the first light sources 10-1 and the second light sources 10-2, a configuration example of combining the red light sources 10R, green light sources 10G and blue light sources 10B is illustrated; however, it is also possible to use only the blue light sources 10B by combined use of the wavelength conversion sheet 14. For example, the wavelength conversion sheet 14 may be provided between the second light emitting surface of the upper light-guiding plate 11B and the optical sheet 13. The wavelength conversion sheet 14 may be made to contain, for example, a fluorescent material that converts a wavelength of a part of blue-color light as predetermined color light into any other wavelength such as red-color light, green-color light, or yellow-color light. In such a manner, for example, white emission light may be obtained by color mixture of blue-color light as predetermined color light from the blue light sources 10B and light after wavelength conversion by the wavelength conversion sheet 14.

FIG. 45 illustrates a specific example of arrangement of the blue light sources 10B attached to the upper light-guiding plate 11B in the present embodiment. FIG. 46 illustrates a specific example of the arrangement of the blue light sources 10B attached to the lower light-guiding plate 11A. As illustrated in FIG. 45 and FIG. 46, a relative position of each of the blue light sources 10B may be offset in such a manner that optical axis positions in X direction of the blue light sources 10B configuring the first light sources 10-1 and the blue light sources 10B configuring the second light sources 10-2 are different from each other.

3. Third Embodiment

Example where Light Sources are Disposed on Side Face in X Direction (FIG. 47)

Next, the description is provided on a light-emitting device (backlight unit) according to a third embodiment of the present disclosure. Hereinafter, it is to be noted that any component parts essentially same as those in any of the backlight units 1 and 1A according to the above-described first and second embodiments are denoted with the same reference numerals, and the related descriptions are omitted as appropriate.

FIG. 47 illustrates a configuration example of light-guiding plates and light sources in the light-emitting device according to the present embodiment. In the above-described first and second embodiments, examples where the first light sources 10-1 and the second light sources 10-2 face side face in Y direction of the lower light-guiding plate 11A and the upper light-guiding plate 11B are illustrated; however, such light sources may face side face in X direction as illustrated in FIG. 47, for example. More specifically, for example, a third side face S3 of the lower light-guiding plate 11A may be used as a first light incidence surface, and the first light sources 10-1 may face the third side face S3. Further, a fourth side face S4 of the upper light-guiding plate 11B may be used as a second light incidence surface, and the second light sources 10-2 may face the fourth side face S4. In this case, the pattern density of the first light sources 10-1 and the second light sources 10-2 may be changed in X direction.

4. Fourth Embodiment

Examples of Application to Display Device

The backlight units 1 and 1A as described above may be incorporated into a display device 2 illustrated in an example in FIG. 48, and may be applicable to electronic apparatuses given below. The display device 2 may be, for example, a liquid crystal display. In this display device 1, for example, a configuration may be made in such a manner that polarization plates 21a and 21b are stacked on a light entry side and a light exit side of a liquid crystal panel 20, and the backlight units 1 and 1A illuminate the liquid crystal panel 20 from behind. Examples of electronic apparatuses may include electronic apparatuses, such as a television, an electronic book, a smartphone, a digital camera, a notebook personal computer, a video camera, and a mobile phone that are described below. In other words, the display device 2 using the above-described backlight units 1 and 1A is applicable to electronic apparatuses in every field that display externally inputted image signals or internally generated image signals as images or video pictures.

Application Example 1

FIG. 49 illustrates an electronic apparatus to be used as a television, and this television has a configuration in which a flat tabular main body section 102 for image display is supported by a stand 103. It is to be noted that the illustrated television is used as a stationary type to be placed on a level surface such as a floor, a shelf, or a table with the stand 103 attached to the main body section 102; however, such a television may be also used as a wall-mounted type with the stand 103 detached from the main body section 102. The main body section 102 is configured to include the above-described display device 2.

Application Example 2

FIG. 50 illustrates an external appearance of an electronic book. FIG. 51 illustrates an external appearance of another electronic book. Any of these electronic books may have, for example, a display section 210 and a non-display section 220, and the display section 210 is constituted by the above-described display device 2.

Application Example 3

FIG. 52 illustrates an external appearance of a smartphone. This smartphone may have, for example, a display section 230 and a non-display section 240, and the display section 230 is constituted by the above-described display device 2.

Application Example 4

Each of FIG. 53 and FIG. 54 illustrates an external appearance of a digital camera. FIG. 53 illustrates an external appearance viewed from the front side (subject side) of the digital camera, and FIG. 54 illustrates an external appearance viewed from the backside (image side) of the digital camera. This digital camera may have, for example, a light-emitting section 410 for flashing, a display section 420, a menu switch 430, and a shutter button 440, and the display section 420 is constituted by the above-described display device 2.

Application Example 5

FIG. 55 illustrates an external appearance of a notebook personal computer. This notebook personal computer may have, for example, a main unit 510, a keyboard 520 for operation of entering characters etc., and a display section 530 for displaying images, and the display section 530 is constituted by the above-described display device 2.

Application Example 6

FIG. 56 illustrates an external appearance of a video camera. This video camera may have, for example, a main unit section 610, a lens 620 provided at a front lateral surface of this main unit section 610 and for shooting an image of a subject, a shooting start and stop switch 630, and a display section 640. The display section 640 is constituted by the above-described display device 2.

Application Example 7

Each of FIG. 57 and FIG. 58 illustrates an external appearance of a mobile phone. For example, this mobile phone may join an upper chassis 710 and a lower chassis 720 by means of a connecting section (hinge section) 730, and may have a display 740, a sub-display 750, a picture light 760, and a camera 770. The display 740 or the sub-display 750 of these component parts is constituted by the above-described display device 2.

5. Other Embodiments

The technology according to the present disclosure is not limited to the above-described embodiments and examples of embodiment, but various modifications may be made.

For example, numerical values are not limited to those provided for illustrative purposes in the above-described examples of embodiment, and any other numerical values may be available.

For example, the technology may include the following configurations.

(1)

A light-emitting device, including:

a first light-guiding plate having a first light incidence surface, a first light emitting surface that emits light toward a predetermined light emission direction, and a first light emission enhancement surface provided with a first pattern; and a second light-guiding plate having a second light incidence surface, a second light emitting surface that emits light toward the light emission direction, and a second light emission enhancement surface provided with a second pattern, the second light-guiding plate facing the first light-guiding plate, wherein the first pattern is a pattern constituted by a plurality of first punctiform sections of which an arrangement pitch changes to cause density of the first punctiform sections to increase as a distance from the first light incidence surface increases, the second pattern is a pattern constituted by a plurality of second punctiform sections of which an arrangement pitch changes to cause density of the second punctiform sections to increase as a distance from the second light incidence surface increases, and when viewed from the light emission direction, regions provided with the first pattern and the second pattern partially overlap, and directions in which densities of the first pattern and the second pattern increase are opposite to each other.

(2)

The light-emitting device according to (1), further including:

a plurality of first light sources facing the first light incidence surface; and a plurality of second light sources facing the second light incidence surface.

(3)

The light-emitting device according to (2), wherein optical axis positions of the first light sources and optical axis positions of the second light sources are different from each other when viewed from the light emission direction.

(4)

The light-emitting device according to (2), wherein each predetermined number of the first light sources and the second light sources respectively configure one light source unit, and optical axis positions of the first light sources in one of the light source units and optical axis positions of the second light sources in a corresponding light source unit are different from each other.

(5)

The light-emitting device according to any one of (1) to (4), wherein the plurality of first punctiform sections change pitch arrangement and size so that their density increases as a distance from the first light incidence surface increases, and the plurality of second punctiform sections change pitch arrangement and size so that their density increases as a distance from the second light incidence surface increases.

(6)

The light-emitting device according to any one of (1) to (5), wherein each of the light-guiding plates further has a side face facing each of the light incidence surfaces, and luminance at an arbitrary position within a viewing plane orthogonal to the light emission direction satisfies the conditions given below:

when $y<0$, $$0.025+1.05\cdot\sin^2\{(y+1)\cdot\pi/4\} > L > (0.45+1.6\cdot y) \qquad (1)$$

when $y \geq 0$, $$-0.075+1.05\cdot\sin^2\{(y+1)\pi/4\} < L < (0.55+1.6\cdot y) \qquad (2)$$

L max=1, and L min=0 where y is a position in a light-guiding direction in each of the light-guiding plates when viewed from the light emission direction (in the light-guiding direction of each of the light-guiding plates, a position of each of the light incidence surfaces is −1, a center is 0, and a position of a side face facing each of the light incidence surfaces is 1), L is a luminance ratio (a luminance ratio at the arbitrary position when either the first light sources or the second light sources are only turned on, when the luminance at the arbitrary position within the viewing plane when both the first and second light sources are turned on is 1), L max is a maximum value of L, and L min is a minimum value of L.

(7)

The light-emitting device according to any one of (2) to (6), wherein the first light sources and the second light sources emit light toward directions opposite to each other when viewed from the light emission direction.

(8)

The light-emitting device according to any one of (2) to (7), wherein each of the plurality of first light sources and the plurality of second light sources includes a laser diode that emits red-color light, a laser diode that emits green-color light, and a laser diode that emits blue-color light.

(9)

The light-emitting device according to any one of (1) to (7), further including a wavelength conversion sheet facing the second light-guiding plate, wherein each of the plurality of first light sources and the plurality of second light sources is a laser diode emitting predetermined color light, and the wavelength conversion sheet converts the predetermined color light into another color light.

(10)

A display device including a display panel and a light-emitting device that illuminates the display panel, wherein the light-emitting device includes:

a first light-guiding plate having a first light incidence surface, a first light emitting surface that emits light toward a predetermined light emission direction, and a first light emission enhancement surface provided with a first pattern; and a second light-guiding plate having a second light incidence surface, a second light emitting surface that emits light toward the light emission direction, and a second light emission enhancement surface provided with a second pattern, the second light-guiding plate facing the first light-guiding plate, wherein the first pattern is a pattern constituted by a plurality of first punctiform sections of which an arrangement pitch changes to cause density of the first punctiform sections to increase as a distance from the first light incidence surface increases, the second pattern is a pattern constituted by a plurality of second punctiform sections of which an arrangement pitch changes to cause density of the second punctiform sections to increase as a distance from the second light incidence surface increases, and when viewed from the light emission direction, regions provided with the first pattern and the second pattern partially overlap, and directions in which densities of the first pattern and the second pattern increase are opposite to each other.

This application claims the priority on the basis of Japanese Patent Application No. 2014-57460 filed on Mar. 20, 2014 in Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light-emitting device, comprising:
a first light-guiding plate having a first light incidence surface, a first light emitting surface that emits light toward a light emission direction, and a first light emission enhancement surface with a first pattern; and
a second light-guiding plate having a second light incidence surface, a second light emitting surface that emits light toward the light emission direction, and a second light emission enhancement surface with a second pattern, wherein the second light-guiding plate faces the first light-guiding plate,
wherein the first pattern includes a plurality of first punctiform sections, wherein a change in a first arrangement pitch of the first pattern causes first density of the plurality of first punctiform sections to increase as a distance from the first light incidence surface increases,
the second pattern includes a plurality of second punctiform sections, wherein a change in a second arrangement pitch of the second pattern causes second density of the plurality of second punctiform sections to increase as a distance from the second light incidence surface increases;
a plurality of first light sources that face the first light incidence surface, wherein the plurality of first light sources constitute a plurality of first light source units; and
a plurality of second light sources that face the second light incidence surface,
wherein the plurality of second light sources constitute a plurality of second light source units,
wherein each determined number of the plurality of first light sources configure a single first light source unit of the plurality of first light source units and each determined number of the plurality of second light sources configure a single second light source unit of the plurality of second light source units, and
wherein optical axis positions of a set of first light sources in the single first light source unit are different from optical axis positions of a set of second light sources in a corresponding second light source unit.

2. The light-emitting device according to claim 1, wherein
as the distance from the first light incidence surface increases, the first density increases based on a first size of the plurality of first punctiform sections, and
as the distance from the second light incidence surface increases, the second density increases based on a second size of the plurality of second punctiform sections.

3. The light-emitting device according to claim 1, wherein each of the first light-guiding plate and the second light-guiding plate further includes a side face that faces each of the first light incidence surface and the second light incidence surface, and luminance at an arbitrary position within a viewing plane orthogonal to the light emission direction satisfies conditions given below:

when y<0, $$0.025+1.05\cdot\sin^2\{(y+1)\cdot\pi/4\}>L>(0.45+1.6\cdot y) \quad (1)$$

when y≥0, $$-0.075+1.05\cdot\sin^2\{(y+1)\cdot\pi/4\}<L<(0.55+1.6\cdot y) \quad (2)$$

L max=1, and L min=0 where
y is a position in a light-guiding direction in each of the first light-guiding plate and the second light-guiding plate when viewed from the light emission direction, wherein in the light-guiding direction of each of the first light-guiding plate and the second light guiding plate, a position of each of the first light incidence surface and the second light incidence surface is −1, a center is 0, and a position of the side face that faces each of the first light incidence surface and the second light incidence surface is 1,
L is a luminance ratio at the arbitrary position,
L max is a maximum value of L, and
L min is a minimum value of L.

4. The light-emitting device according to claim 1, wherein the plurality of first light sources emit light toward a first direction and the plurality of second light sources emit light toward a second direction, wherein the first direction is opposite to the second direction when viewed from the light emission direction.

5. The light-emitting device according to claim 1, wherein each of the plurality of first light sources and the plurality of second light sources includes a first laser diode that emits red-color light, a second laser diode that emits green-color light, and a third laser diode that emits blue-color light.

6. The light-emitting device according to claim 1, further comprising a wavelength conversion sheet that faces the second light-guiding plate,
wherein each of the plurality of first light sources and the plurality of second light sources is a laser diode that emits a specific color light, and
wherein the wavelength conversion sheet is configured to convert the specific color light to a first color light different from the specific color light.

7. A display device, comprising
a display panel;
a light-emitting device configured to illuminate the display panel;
a first light-guiding plate having a first light incidence surface, a first light emitting surface that emits light toward a light emission direction, and a first light emission enhancement surface with a first pattern; and
a second light-guiding plate having a second light incidence surface, a second light emitting surface that emits light toward the light emission direction, and a second light emission enhancement surface with a second pattern, wherein the second light-guiding plate faces the first light-guiding plate,
wherein the first pattern includes a plurality of first punctiform sections, wherein a change in a first arrangement pitch of the first pattern causes first density of the plurality of first punctiform sections to increase as a distance from the first light incidence surface increases,
the second pattern includes a plurality of second punctiform sections, wherein a change in a second arrangement pitch of the second pattern causes second density of the plurality of second punctiform sections to increase as a distance from the second light incidence surface increases;
a plurality of first light sources that face the first light incidence surface, wherein the plurality of first light sources constitute a plurality of first light source units; and
a plurality of second light sources that face the second light incidence surface, wherein the plurality of second light sources constitute a plurality of second light source units,
wherein each determined number of the first light sources configure a single first light source unit of the plurality of first light source units and each determined number of the second light sources configure a single second light source unit of the plurality of second light source units, and
wherein optical axis positions of a set of first light sources in the single first light source unit are different from optical axis positions of a set of second light sources in a corresponding second light source unit.

8. The light-emitting device according to claim 1, wherein when viewed from the light emission direction, regions with the first pattern and the second pattern partially overlap, and a first direction in which the first density of the first pattern increases is opposite to a second direction in which the second density of the second pattern increase.

* * * * *